United States Patent [19]

Palansky et al.

[11] Patent Number: 5,460,582
[45] Date of Patent: Oct. 24, 1995

[54] AUTOMATIC TRANSMISSION CONTROL SYSTEM HAVING ELECTRONIC SHIFT CONTROLLERS AND A SOLENOID VALVE DIAGNOSTIC TEST DURING AN UPSHIFT

[75] Inventors: Bruce J. Palansky, Livonia; Pamela J. Eggers, Milan; Richard R. Hathaway, Plymouth; Earl R. Hoffman, Wixom, all of Mich.

[73] Assignee: Ford Motor Company, Dearborn, Mich.

[21] Appl. No.: 135,936

[22] Filed: Oct. 13, 1993

[51] Int. Cl.⁶ .............................. F16H 61/12; F16H 59/68
[52] U.S. Cl. .......................... 477/138; 477/155; 477/906
[58] Field of Search ............................. 477/97, 906, 138, 477/155; 364/424.03

[56] References Cited

U.S. PATENT DOCUMENTS

| | | | |
|---|---|---|---|
| 4,951,205 | 8/1990 | Lowe et al. | 364/424.03 X |
| 5,016,174 | 5/1991 | Ito et al. | 477/906 X |
| 5,048,374 | 9/1991 | Miyake et al. | 477/906 X |
| 5,113,720 | 5/1992 | Asayama et al. | 477/155 X |
| 5,129,287 | 7/1992 | Asada et al. | 477/906 X |

FOREIGN PATENT DOCUMENTS

| | | | |
|---|---|---|---|
| 362177345 | 8/1987 | Japan | 477/906 |
| 404347052 | 12/1992 | Japan | 477/906 |
| 405223156 | 8/1993 | Japan | 477/906 |

*Primary Examiner*—Khoi O. Ta
*Attorney, Agent, or Firm*—Frank G. McKenzie; Roger L. May

[57] ABSTRACT

An automatic transmission having multiple-ratio gearing, fluid pressure-operated clutches and brakes adapted to establish and to disestablish multiple torque ratios and electronic shift control solenoids that can be energized and de-energized under the control of an electronic microprocessor that senses transmission operating variables, and a control strategy inherent in the microprocessor that uses predetermined failure modes to perform functional testing on the shift solenoids without special hydraulic and electronic hardware for developing the diagnostic information that detects shift solenoid failures or malfunctions.

10 Claims, 16 Drawing Sheets

| GEAR | | SOLENOID STATES SS1 | SS2 | CLUTCH, BAND, OWC B1 | B2 | C1 | C2 | C3 | C4 | C5 | C6 | RATIO |
|---|---|---|---|---|---|---|---|---|---|---|---|---|
| 1 | M | ON | OFF | | X | X | | | X | | | 2.400 |
| | D | | | | | X | | | X | | | |
| 2 | M | OFF | OFF | X | | X | | | OR | X | X | 1.467 |
| | D | | | | | X | | | ↓ | X | X | |
| 3 | | OFF | ON | | | X | X | | ↓ | X | OR | 1.000 |
| 4 | | ON | ON | X | | | | X | ▼ | X | OR | .667 |
| R | | ON | OFF | | X | | X | | | | | -2.000 |
| N | | ON | OFF | | | | | | | | | |
| P | | ON | OFF | | | | | | | | | |

FIG. 2

| GEAR REQ. | SHIFT SOL 2 | SHIFT SOL 1 |
|---|---|---|
| 1 | OFF | ON |
| 2 | OFF | OFF |
| 3 | ON | OFF |
| 4 | ON | ON |

FIG. 6

|  | CT | PT, WOT |
|---|---|---|
| 1st, 2nd Gear | OD-D/2-1 —— 390 Orifice 380 —— F.C.<br>OD-D ———— ODR<br>(Eng'mt Logic) | OD-D/2-1 ———— F.C.<br>OD-D ———— ODR<br>(4-2 KD Logic) |
| 3rd Gear | 390<br>OD-D/2-1 —•— F.C.<br>Orifice 388<br>—— ODR<br>(4-3 Coast Logic) | 390<br>OD-D/2-1 —— F.C.<br>Orifice 392<br>—— ODR<br>(4-3 T.D. Logic) |
| 4th Gear | X —— F.C.<br>Orifice 417<br>—— ODR<br>Gasket Bleed 430 | Same As CT |

FIG. 5

| SHIFT SOLENOID 1 FAILED OFF | | | | | SHIFT SOLENOID 1 FAILED ON | | | |
|---|---|---|---|---|---|---|---|---|
| GEAR REQ. | SHIFT SOL 2 | SHIFT SOL 1 | ACTUAL GEAR | | GEAR REQ. | SHIFT SOL 2 | SHIFT SOL 1 | ACTUAL GEAR |
| 1 | OFF | OFF | 2 | | 1 | OFF | ON | 1 |
| 2 | OFF | OFF | 2 | | 2 | OFF | ON | 1 |
| 3 | ON | OFF | 3 | | 3 | ON | ON | 4 |
| 4 | ON | OFF | 3 | | 4 | ON | ON | 4 |
| 1-2 & 3-4 SHIFTS FAILED TEST; 2-3 SHIFT PASSED TEST | | | | | 1-2 & 3-4 SHIFTS FAILED TEST; 2-3 SHIFT PASSED TEST | | | |

FIG. 6A

| SHIFT SOLENOID 2 FAILED OFF | | | | | SHIFT SOLENOID 2 FAILED ON | | | |
|---|---|---|---|---|---|---|---|---|
| GEAR REQ. | SHIFT SOL 2 | SHIFT SOL 1 | ACTUAL GEAR | | GEAR REQ. | SHIFT SOL 2 | SHIFT SOL 1 | ACTUAL GEAR |
| 1 | OFF | ON | 1 | | 1 | ON | ON | 4 |
| 2 | OFF | OFF | 2 | | 2 | ON | OFF | 3 |
| 3 | OFF | OFF | 2 | | 3 | ON | OFF | 3 |
| 4 | OFF | ON | 1 | | 4 | ON | ON | 4 |
| 2-3 & 3-4 SHIFTS FAILED TEST; 1-2 SHIFT PASSED TEST | | | | | 1-2 & 2-3 SHIFTS FAILED TEST; 3-4 SHIFT PASSED TEST | | | |

FIG. 6B

AUTOMATIC TRANSMISSION CONTROL SYSTEM HAVING ELECTRONIC SHIFT CONTROLLERS AND A SOLENOID VALVE DIAGNOSTIC TEST DURING AN UPSHIFT

TECHNICAL FIELD

The invention is an on-board diagnostic circuit for an automatic power transmission for automotive vehicles with electronic ratio shift controllers.

BACKGROUND OF THE INVENTION

Our invention is adapted especially to be incorporated in a transmission control system of the kind disclosed in U.S. application Ser. No. 926,627, filed Aug. 10, 1992, entitled "Automatic Transmission Control System", now U.S. Pat. No. 5,305,663, issued Apr. 26, 1994, which is assigned to the assignee of our invention.

The control system of the patent identified above includes three shift valves that are under the control of two solenoid actuators. The shift valves are actuated in a controlled pattern to effect three ratio changes between a low ratio and an intermediate ratio, between an intermediate ratio and a direct-drive ratio, and between a direct-drive ratio and an overdrive ratio. Only two solenoid actuators are needed to control ratio changes between the four driving ratios.

An electronic microprocessor is included in the control system for establishing ratio changes that meet operating demands as determined by sensors that measure driveline variables; i.e., vehicle speed, engine torque, drive range selector position, engine speed and operating temperature, as well as other variables. The microprocessor includes modules capable of performing shift diagnostic strategies for the purpose of detecting when a problem exists in the shift controllers regardless of whether the problem is caused by an electronic failure, a mechanical failure or a hydraulic failure. If a failure is detected, a code in the software for the microprocessor is called out and an appropriate indicator is activated so that a service technician may take the proper repair action to eliminate the problem. The problem signal that is established may be an indicator light (MIL) on the vehicle dash. A special indicator light is illuminated if the functional problem is due to an electronic component failure only rather than due to a failure of the hydraulics or the hardware involved in the ratio change. It is possible, of course, to conduct a pure electrical test of the system if a problem is detected in order to determine whether the electronics is a contributor to the problem.

Our present invention is an extension of known diagnostic strategy since it permits the identification of the electronics as a contributor to a malfunction in the control system without relying solely on an electrical test of the solenoids. It makes possible discrimination of electrical component failures from other failures that might occur. Known diagnostic strategies consider one shift at a time and determine whether that shift occurred properly or not. They do not make it possible to detect whether a shift failure is due solely to a particular solenoid failure.

A control system of the kind disclosed in the patent identified above has a valve system that cooperates with the solenoid valve actuators. The actuators respond to control signals from an electronic microprocessor. A change in state of the solenoid operators results in a shift response as the transmission is conditioned for varying ratios as the vehicle operating conditions require. The solenoid actuators must be operated in sequence as the solenoids change state in order to effect a given ratio change. Thus, each actuator must be carefully calibrated to avoid variations in the responses of the valve system.

BRIEF DESCRIPTION OF THE INVENTION

The shift strategy of our invention includes shift validation logic that verifies that a shift has taken place after it is commanded. It is capable of verifying shifts which take place under steady state operating conditions. The shifts must be automatic upshifts with the vehicle "off idle", and the vehicle speed must be over a calibrated minimum speed for each gear. This ensures that the vehicle is operating under power and that the torque converter is operating above the coupling point. The logic determines when each of three possible upshifts has been tested and whether the tests for upshifts were either passed or failed.

The shift solenoid functional test logic uses the results of the shift validation logic to determine if the shift solenoids are failed. This requires a monitoring of the 1-2 upshift, the 2-3 upshift, and the 3-4 upshift throughout several background control loops of the electronic microprocessor. The control system records the combination of the good and bad upshifts and checks that information to determine if the cause of the malfunction is a solenoid failure.

The control system is characterized by a compact assembly of the movable shift valve elements that control ratio changes in the gearing. The valve element that control changes between the first ratio and the second ratio, for example, is located in a valve bore that is common to the movable valve element that controls ratio changes between the second ratio and the third ratio. Only one solenoid state change is required to effect a response of both the first shift valve and the second shift valve. There is no need for effecting independent operation of each of the two shift valves with separate solenoid actuators or hydraulic pressures. Orificing and timing control elements are not needed because timing considerations are removed by reason of the common actuators for the two shift valves.

Provision is made also in the valve system for causing an automatic ratio change to the second ratio in the event of a loss of power in the electrical system. Both of the solenoid actuators are deactivated in the event of such a malfunction, but the control system is designed so that upon the occurrence of a loss of power to the solenoids, the shift valve mechanisms will be shifted automatically to the second ratio position.

The shift solenoid actuators of the valve system may be simple "through-flow" actuators in which leakage across the actuator orifice is under the control of the shift solenoid valve.

During fourth ratio operation, which is the ratio in which most of the operating time occurs, both solenoids are on. Thus leakage flow across the orifices is eliminated. Leakage flow thus occurs only in a relatively small percentage of the total operating time in which the transmission is conditioned for underdrive ratio operation. This permits the use of simplified, reliable solenoid operators without a significant penalty resulting from leakage across the solenoid orifices during start-up of the vehicle when the transmission is accelerating from a standing start or when the control system is sequencing through the lower gear ratios. Further, the lack of leakage during operation in fourth ratio prevents wasting pump flow when the available flow is reduced due to low engine speed.

The control system may include also a compact shift valve assembly having a common spring acting on each of two shift valves that control the ratio change between the second ratio and the third ratio and between the first ratio and the second ratio. For a normal one-step shift (e.g., first ratio to second ratio or fourth ratio to third ratio), only one solenoid changes state. Thus, no variability is introduced due to coordination of two solenoids changing state during a shift.

The shift valves are mechanically engageable, one with respect to the other, so that actuation of a first one of the valves in response to a signal from the solenoid operator associated with that valve will cause the second or companion valve to be shifted to the position it should assume when that solenoid operator for the first valve is triggered. A separate and independent force is not required to effect movement of the second shift valve when the first shift valve is triggered by a solenoid operator.

Only one bad shift out of the three possible shifts could not be the result of a solenoid failure. Each solenoid failure causes two bad shifts. If both solenoids are failed, all three shifts will be bad.

Our improved strategy makes it possible to identify the characteristic operational results of solenoid failures and to compare the diagnostic information to those known patterns. If a match is found, it is flagged as an appropriate solenoid error, and an indicator light on the vehicle dash indicating a malfunction is illuminated. If there is no match found for the patterns that are known to result from the possible discrete solenoid failure conditions, then there is no need to illuminate the dash light and conventional operator notification and effects management may continue.

BRIEF DESCRIPTION OF THE DRAWINGS

FIG. 2 is a chart that shows the clutch and brake engagement and release pattern for the clutches and brakes of the transmission shown in FIG. 1 as the ratio changes are effected upon engagement and release of the clutches and brakes.

FIG. 5 is an orificing diagram for the circuit of FIGS. 4, 4A and 4B showing the orifices that are effective for each gear ratio.

FIG. 6 is a table that shows the operating sequence of two shift solenoids during each of four forward-driving ratios.

FIG. 6A is a chart similar to FIG. 6 indicating the operating state of solenoid 1 when the 1-2 shift and the 3-4 shift are bad and when the 2-3 shift is good.

FIG. 6B is a chart similar to FIG. 6 indicating the state of solenoid 2 when the 3-2 and 3-4 shifts are bad and the 1-2 shift is good and when the 1-2 shift and the 3-4 shift are bad and the 3-4 shift is good.

PARTICULAR DESCRIPTION OF THE INVENTION

Figure 8A:
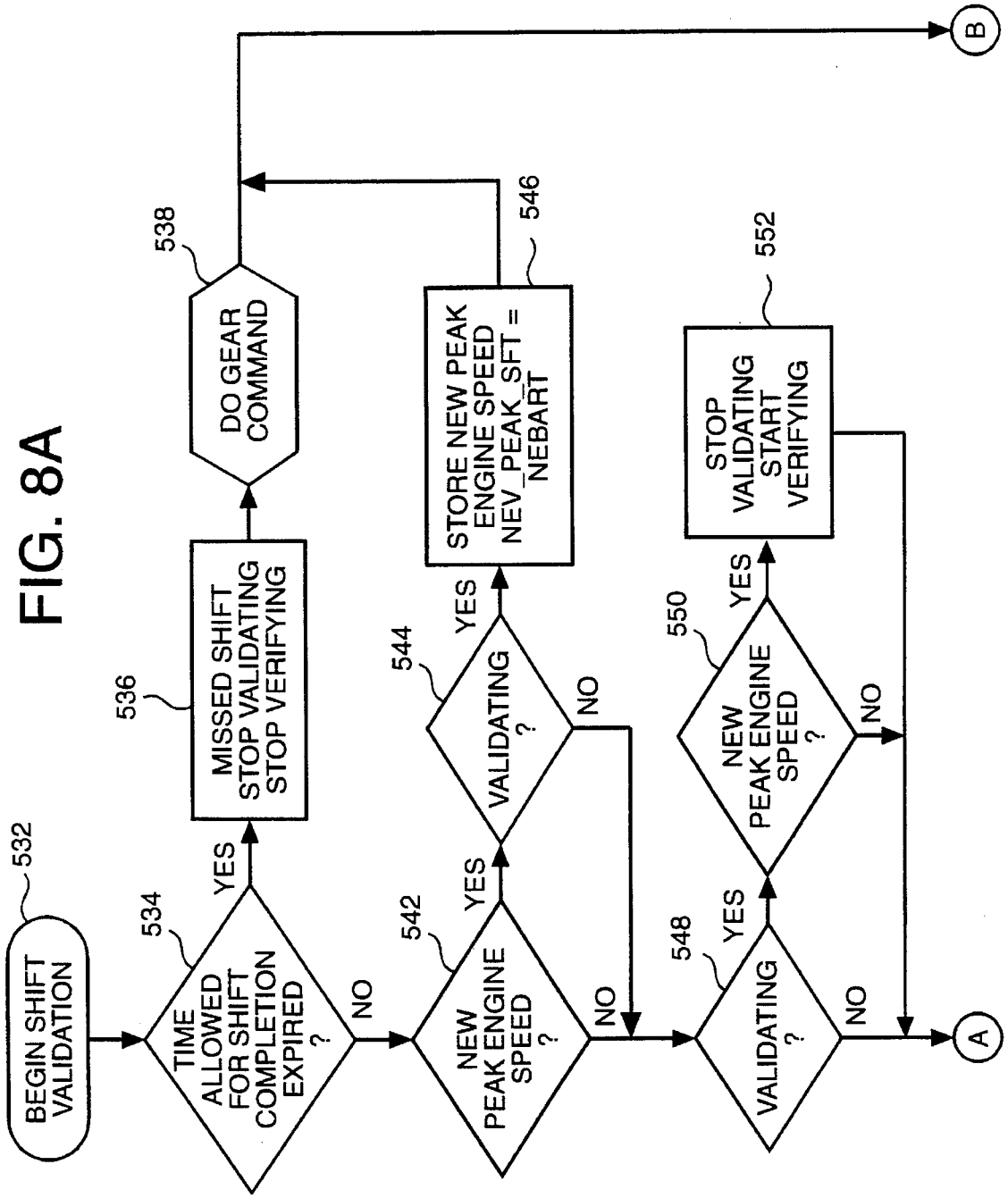
FIGS. 8A and 8B show a flow diagram indicating the shift validation logic for the microprocessor.
Figure 8B:
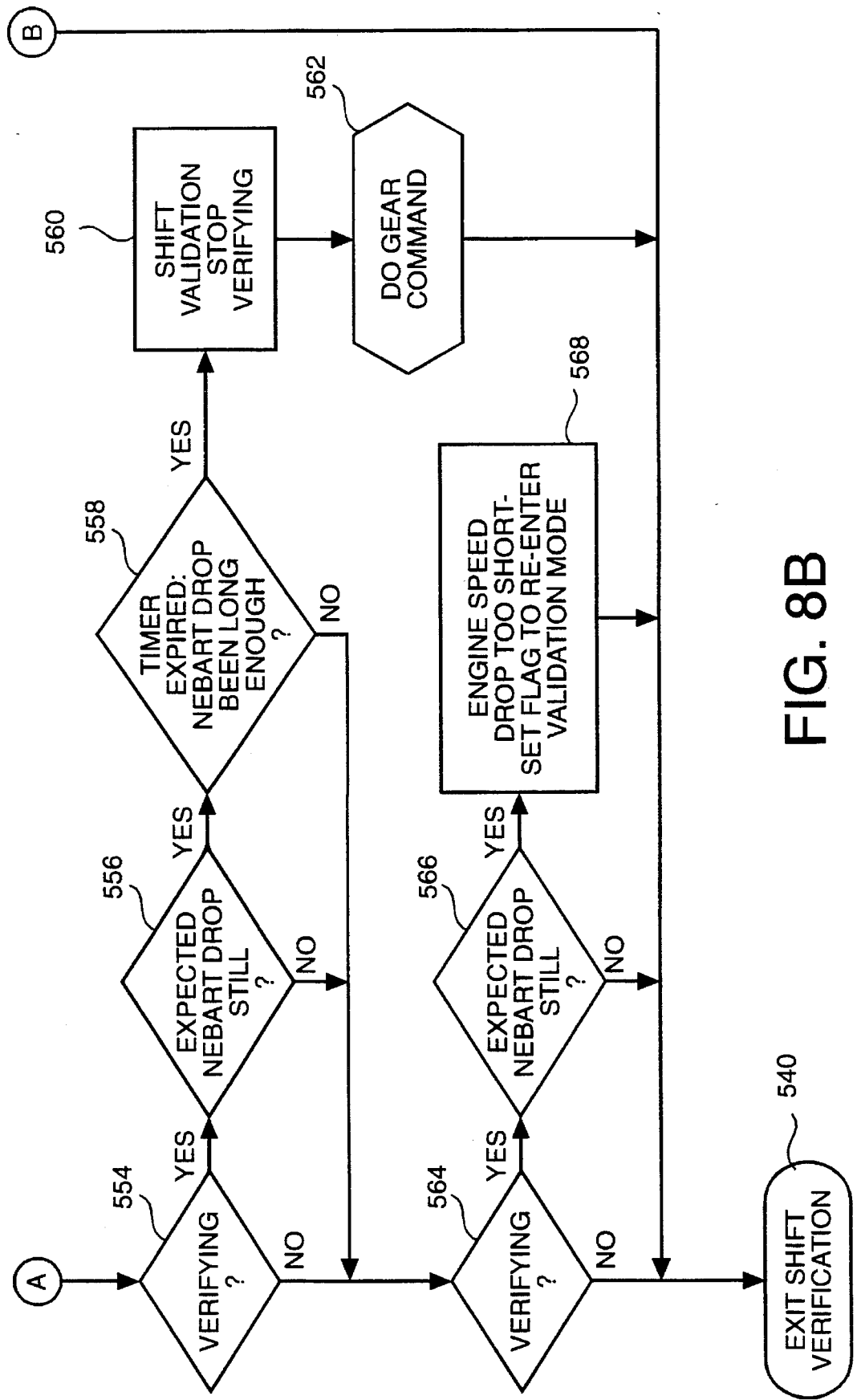

The shift solenoid logic for the functional test uses the results of the shift validation logic of FIGS. 8A and 8B to determine if the shift solenoids are failed or not. After a 1-2 upshift, a 2-3 upshift and a 3-4 upshift have been monitored, the combination of failed upshifts is checked to determine if the failed shifts suggest a solenoid failure. One failed shift could not be the result of a solenoid failure, as will be apparent from the subsequent description of the control valve system. Each solenoid failure causes two shift failures. That is because each shift solenoid has multiple functions. If both solenoids are failed, all three shifts will fail. If there are no malfunctioning solenoids, the actual gear will be equal to the requested or commanded gear and all shifts will be good.

The Converter and Gearing

Figure 1:
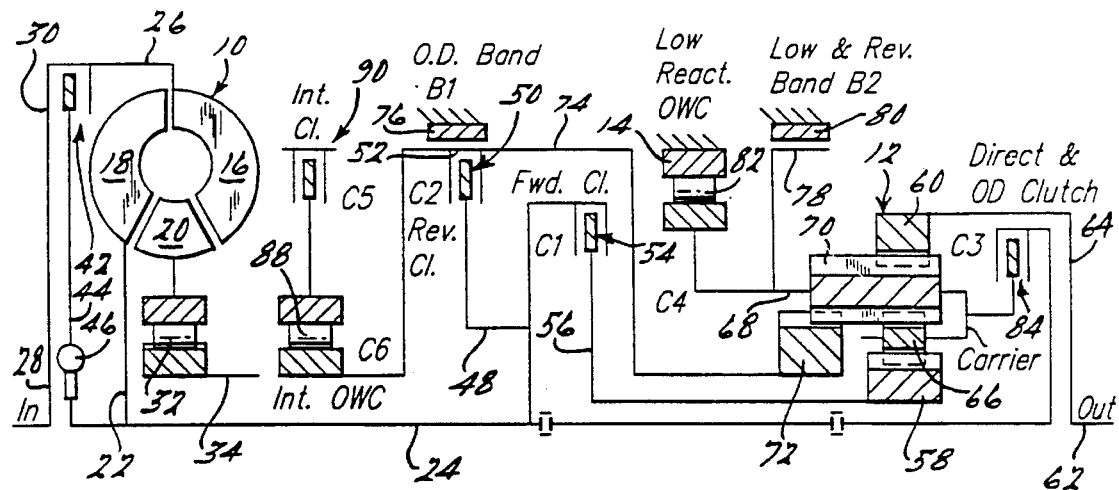
FIG. 1 is a schematic representation of a torque converter and gear system for a transmission having a control system that embodies our invention.

In the schematic view of the transmission seen in FIGS. 1 and 2, numeral 10 designates a hydrokinetic torque converter and numeral 12 designates a compound planetary gear unit. The converter 10 and the gear unit 12 are located in a transmission housing.

The converter 10 includes a bladed impeller 16, a bladed turbine 18, and a bladed stator 20. The converter elements 16, 18 and 20 form a toroidal fluid flow path in known fashion, whereby impeller torque is multiplied hydrokinetically to produce a turbine torque that is distributed through turbine hub 22 to the turbine shaft 24. The impeller is enclosed within an impeller housing, which is bolted to an engine crankshaft.

Stator 20 is mounted on a one-way brake 32 and is supported by stationary turbine sleeve shaft 34.

A transmission pump, which may include positive displacement Gerotor pump elements, is connected drivably to the impeller 16.

A torque converter bypass clutch, generally shown at 42, includes a clutch plate 44 adapted to engage the adjacent wall of the impeller housing. It is secured to turbine 18 by means of a damper assembly 46. Fluid is distributed radially outward through the space between the clutch plate 44 and the adjacent wall of the impeller housing when the clutch is disengaged. The converter at that time acts as an open converter and is capable of multiplying torque hydrokinetically. Fluid is supplied continuously to the toroidal cavity of the converter and the pressure thus developed applies the clutch by engaging the clutch plate 44 against the adjacent frictional surface of the impeller housing. The outward radial flow through the space between the plate 44 and the adjacent wall of the impeller housing is interrupted when the clutch is applied.

The torque of the turbine is transferred through the turbine shaft to the torque input side 48 of reverse clutch 50 and to the torque input side 52 of forward clutch 54. The output side 56 of the forward clutch 54 is connected to sun gear 58 of the planetary gear unit 12. The ring gear 60 of the gear unit 12 is connected to a torque output shaft 62 through torque transfer member 64.

Sun gear 58 engages a first set of planet pinions 66 supported on carrier 68. Pinions 66 engage companion pinions 70 which in turn mesh with the ring gear 60. Pinions 70 mesh with a second sun gear 72. The torque output side of the reverse clutch 50 is connected to sun gear 72 through torque transfer member 74. A brake drum 76 forms a part of the torque output portion of reverse clutch 50. The brake band for drum 76 is applied during overdrive operation to anchor sun gear 72.

Carrier 68 journals both sets of pinions 70 and 66 and is connected to reverse brake drum 78. Brake band 80 surrounds brake drum 78 and is applied during reverse drive operation. An overrunning brake 82 anchors the carrier 68 during operation in the first speed ratio as forward drive reaction torque is delivered to the housing 14.

Carrier 68 is adapted to be connected to the turbine shaft 24 through direct-drive clutch 84.

Brake drum 76 is connected to the outer race 86 of an overrunning brake 88. Race 86 is adapted to be braked by friction brake 90 to the transmission housing 14. When brake 90 is applied, overrunning brake 88 is adapted to deliver reaction torque to the housing through the friction brake 90 during intermediate ratio operation.

For a particular description of the mode of operation of the transmission of FIG. 1, reference may be made to U.S. Pat. No. 4,934,216, which is assigned to the assignee of our invention. For present purposes, however, the mode of operation can be summarized by referring to FIG. 2. This figure is a chart indicating the clutches and brakes that are engaged or released to established each of the ratios and each of the multiple drive ranges.

To simplify the description, FIG. 2 carries the symbol B1 to identify the overdrive brake band 76, the symbol B2 to identify the reverse brake band 80, the symbol C1 to identify the forward clutch 54, the symbol C2 to identify the reverse clutch 50, the symbol C3 to identify the direct and overdrive clutch 84, the symbol C4 to identify the overrunning brake 82, the symbol C5 to identify the intermediate clutch 90 and the symbol C6 to identify the overrunning brake 88. FIG. 2 also shows solenoid states for solenoid SS1 and solenoid SS2, which will be described subsequently.

During operation in the first gear ratio in the automatic drive mode, clutch C1 is applied and brake C4 is applied. Torque is delivered to the turbine shaft 24, and then it is transferred through the clutch C1 to the sun gear 58. The carrier 68 acts as a reaction member since it is braked by brake C4. Thus, the ring gear 60 is driven in a forward driving direction with the highest torque multiplication ratio. If coast-braking is desired (manual range), brake band 80 is applied thus permitting reaction torque to be distributed to the housing 14 in a reverse driving direction.

An upshift to the second ratio is achieved by applying intermediate brake C5. This permits the sun gear 72 to act as a reaction point and the overrunning brake C4 begins to overrun. Torque is distributed to the housing through the brake C5 and through the overrunning brake C6.

An upshift to the third ratio from the second ratio is achieved by engaging direct-drive clutch C3 while clutch C1 remains applied. Thus, all of the elements of the gearing then are locked together for rotation in unison.

Fourth ratio is achieved by releasing clutch C1 and applying brake band B1. Sun gear 72 then acts as a reaction point as the input torque is delivered through the clutch C3, thus overdriving the ring gear 60.

Reverse drive is obtained by applying brake band 80 thus anchoring the carrier. Engagement of the reverse clutch 50 results in torque transfer from shaft 24 to the sun gear 72. With the carrier 68 acting as a reaction member, ring gear 60 is driven in a reverse direction as sun gear 72 acts as a torque input element.

The Microprocessor Controller

Figure 3:
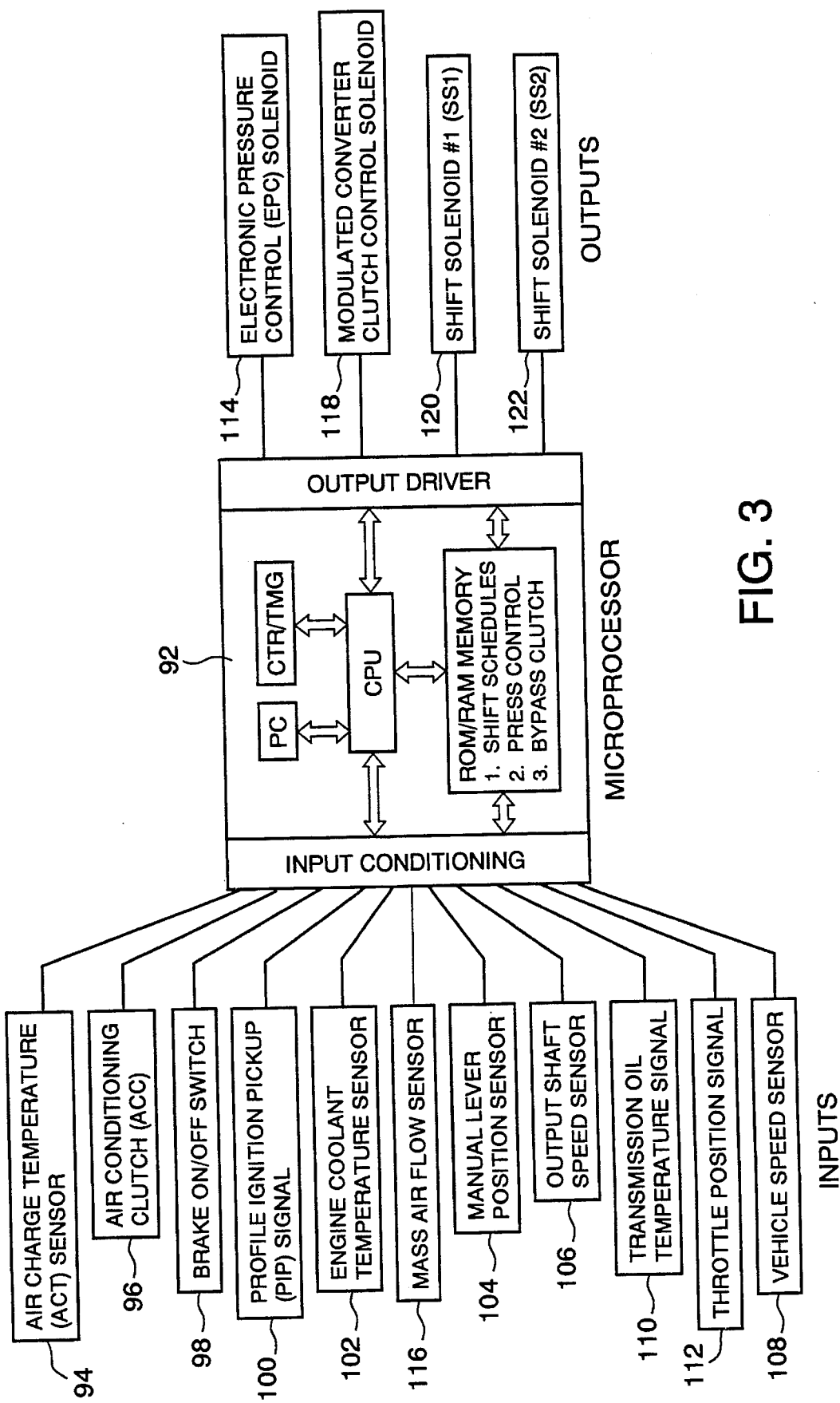
FIG. 3 is a block diagram illustrating function flow from the input of the microprocessor of our invention to the output driver circuits for the shift solenoids.

FIG. 3 is a schematic drawing of a microprocessor that is used to control the valve circuits that in turn control distribution and exhaust of actuating pressure to the clutch and brake servos for the transmission. The microprocessor is shown at 92 in FIG. 3.

As schematically represented in FIG. 3, an air-charge temperature sensor 94 is adapted to develop an ambient air temperature that is used by the microprocessor in developing commands issued to the control valve system. The microprocessor also responds to an air conditioner clutch signal from sensor 96, which indicates whether the air conditioning system is on or off. This is one of the sources of parasitic torque loss that must be accounted for by the microprocessor in issuing instructions to the solenoid valves of the valve circuit.

A brake on/off switch 98 is triggered by the vehicle brakes and the on/off signal is delivered to the processor.

An engine speed sensor 100 measures crankshaft speed and engine coolant temperature is sensed by temperature sensor 102.

The drive range selected by the operator is indicated by a manual lever position sensor 104. A transmission output shaft speed sensor 106 provides an indication of the driven shaft speed for output shaft 62. That speed is related to the vehicle speed signal developed by sensor 108, the vehicle speed being a function of output shaft speed times the gear ratio that exists at any instant. A transmission oil temperature signal is delivered to the microprocessor by sensor 110. An engine throttle position signal is delivered to the processor by sensor 112.

The transmission does not include a turbine speed sensor. However, a turbine speed value readily can be determined by the microprocessor if either the output shaft speed or the vehicle speed is known and if the gear ratio is known. These variables that determine speed can be used by the microprocessor in computing turbine speed at any instant. The turbine speed then can be compared to engine speed to detect torque converter slip at any instant.

The signals that are delivered to the valve circuit are received by an electronic pressure control solenoid 114, which is indicated generally in FIG. 25. The duty cycle for that solenoid can be changed to develop the required circuit pressure at any instant so that the capacities for the clutches and the brake servos are maintained at every instant at their optimum values for the required torque delivery capacity. The duty cycle is determined by the throttle position sensor signal developed by sensor 112 as well as the signal developed by mass air flow sensor 116, which measures the mass air flow at any instant at the engine throttle body for the internal combustion engine with which the transmission is used. The slip value that is determined by the microprocessor is used to develop a duty cycle that is received by modulated converter clutch control solenoid 118.

Figures 11, 11A:
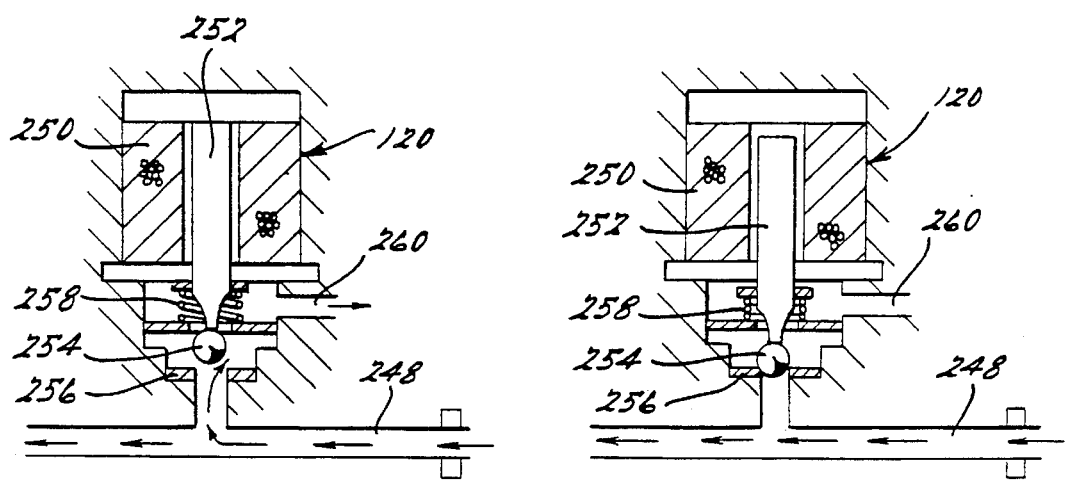
FIGS. 11 and 11A show a schematic diagram of a shift solenoid in both the de-energized state and the energized state.

The control valve circuit includes two solenoid operated shift valves which receive shift signals. These are on/off signals from the microprocessor. They are received by shift solenoid number 1, shown at 120, and shift solenoid number 2, shown at 122. These shift solenoids will be described subsequently. Solenoid 120 is illustrated in FIGS. 11 and 11A. Solenoid 122 has not been separately illustrated in the drawings since it is similar to solenoid 120. Both solenoids are packaged in a single assembly.

The sensor inputs, such as the engine-related sensor signals indicative of engine coolant temperature, barometric absolute pressure, etc., are used by the microprocessor to develop more accurate outputs as the load and climate conditions change. Other inputs are based on driver commands such as the engine throttle position. Still other inputs to the microprocessor are developed by the transmission itself, such as the output shaft speed sensor signal, the manual lever position signal and the transmission oil temperature signal. The microprocessor will develop the appropriate shift time and conditions for shifts in the ratio as well as control the clutch application and release. Line pressure also is developed by the microprocessor to establish optimum shift feel.

The microprocessor is an integrated vehicle engine and transmission microprocessor which converts signals, such as the signals from a vehicle speed sensor and an engine throttle position sensor, engine temperature sensor, turbine speed sensor and the manual selector lever, into electrical signals for the shift solenoid valves, the solenoid valve for the converter bypass clutch and the variable force solenoid for the electronic pressure control. The microprocessor receives the sensor signals and operates on them in accordance with programmed control strategy, which will be described. The microprocessor includes appropriate gates and driver circuits for delivering the output of the operation of the strategy to the hydraulic control valve body for the transmission.

The microprocessor includes a central processor unit (CPU) having a read only memory (ROM) in which the programs (strategy) and calibration data are stored, a control unit that includes a read-write memory or RAM and internal busses between the memory and the central processor arithmetic logic unit.

The central processor unit executes programs that are obtained from the memory and provides the appropriate control signals to a valve circuit as the input signal conditioning portions of the microprocessor reads the input data and the computation logic portions deliver the results of the computation to the output driver system under the program control.

The memory includes both a random access memory (RAM) and a read-only memory (ROM), the latter storing the information that comprises the control logic. The result of the computations carried out on the input data is stored in RAM where it can be addressed, fetched, erased, rewritten or changed, depending upon the operating conditions of the vehicle. The CPU portions that perform the computations comprise an integrated circuit distinct from the microprocessor chip that comprises the memory portions. The memory and the CPU computation portions are connected by internal bus and interface circuitry.

Data may be read from a first memory location as the CPU seeks an instruction from the memory. The fetched data is then fed into a data register or storage area and then to an instruction decoder. When an instruction is to be carried out, the data that is fetched is transferred to an arithmetic logic unit. Then, sequentially pursuant to instructions in the instruction decoder, other data may be fetched from memory and fed into the data registers. The data may be a shift time delay value, for example, and may be stored in an accumulator until it is addressed during shift sequencing of the CPU.

Also sequentially, the data in the accumulator may be transferred to the data register and then fed back into memory and stored in the next memory location within the random access memory (RAM) where it may be addressed during the next background loop.

The data that is stored in ROM memory may, for example, be shift schedule information or functions in which two variables, such as throttle position and vehicle speed, are related one to the other in accordance with a shift function. The data also may be in the form of information in a table containing three variables or data such as a timer value and values for the other two pieces of data or variables.

The control strategy for the transmission is divided into several routines and control modules which are executed sequentially in known fashion during each background pass. The strategy for each module is executed furthermore in sequential fashion, just as the modules themselves are executed in sequential fashion. The various data registers are initialized as input data from the previously mentioned sensors are introduced into the input signal conditioning portion of the microprocessor. The information that results from the inputting of the sensor data, together with information that is stored in memory and learned from a previous background pass, is used to carry out the control functions of the shift solenoid valves, the throttle pressure solenoid valve, and the bypass clutch solenoid valve. The modules and sub-modules are executed in sequence in each background loop. Each module or logic portion is independent of the others and performs a specific function. They are executed as they are separately addressed by the processor pointer. These functions occur after the input signals are received by the input gates and the signal conditioning portions of the microprocessor and after the input signal conditioning has occurred.

The Control Valve Circuit

Figure 4:
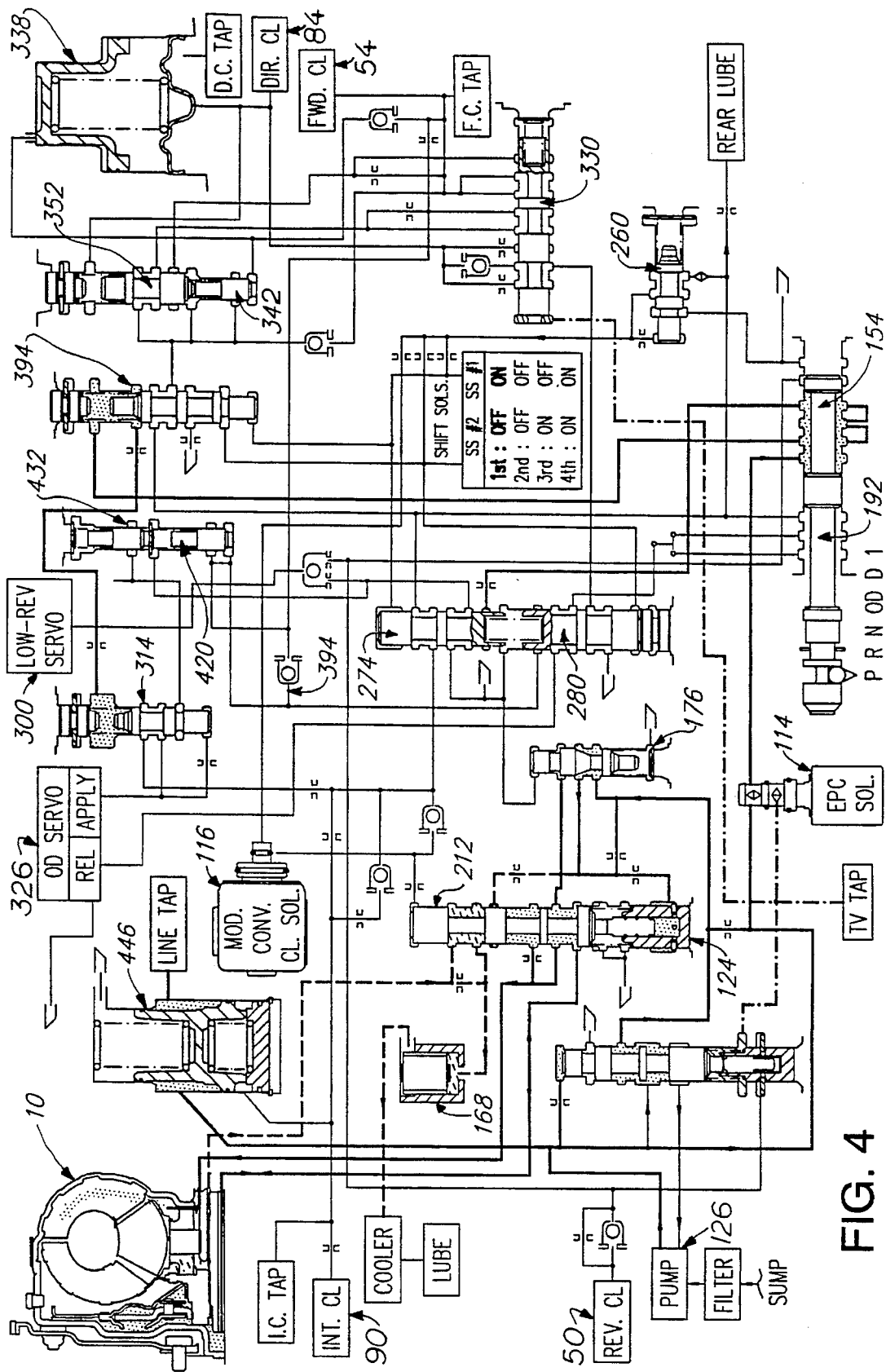
FIG. 4 is a schematic valve diagram of a control valve system for controlling the transmission illustrated schematically in FIG. 1.
Figure 4A:
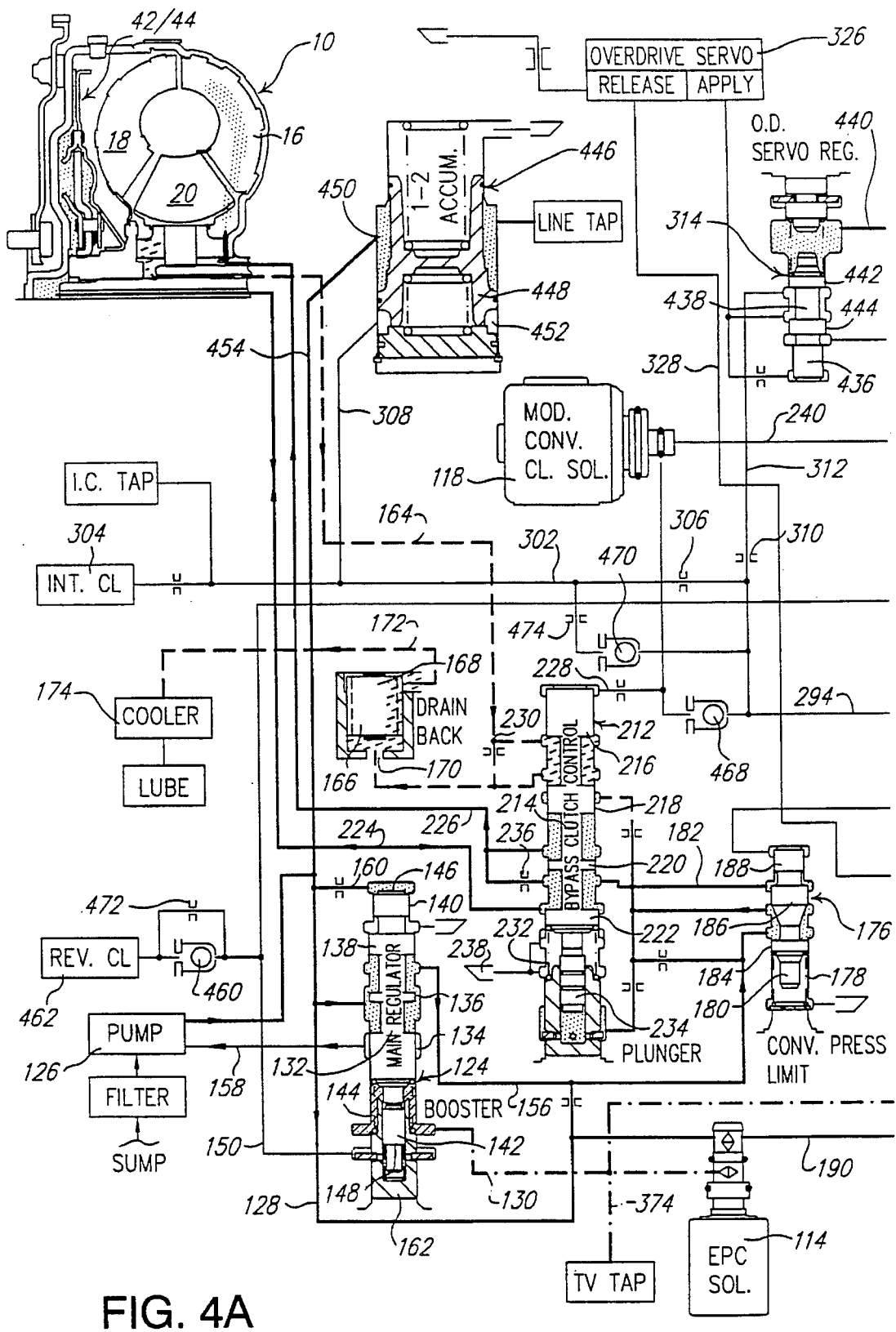
FIGS. 4A and 4B, taken together, show an enlarged version of separate portions of the diagram of FIG. 4.
Figure 4B:
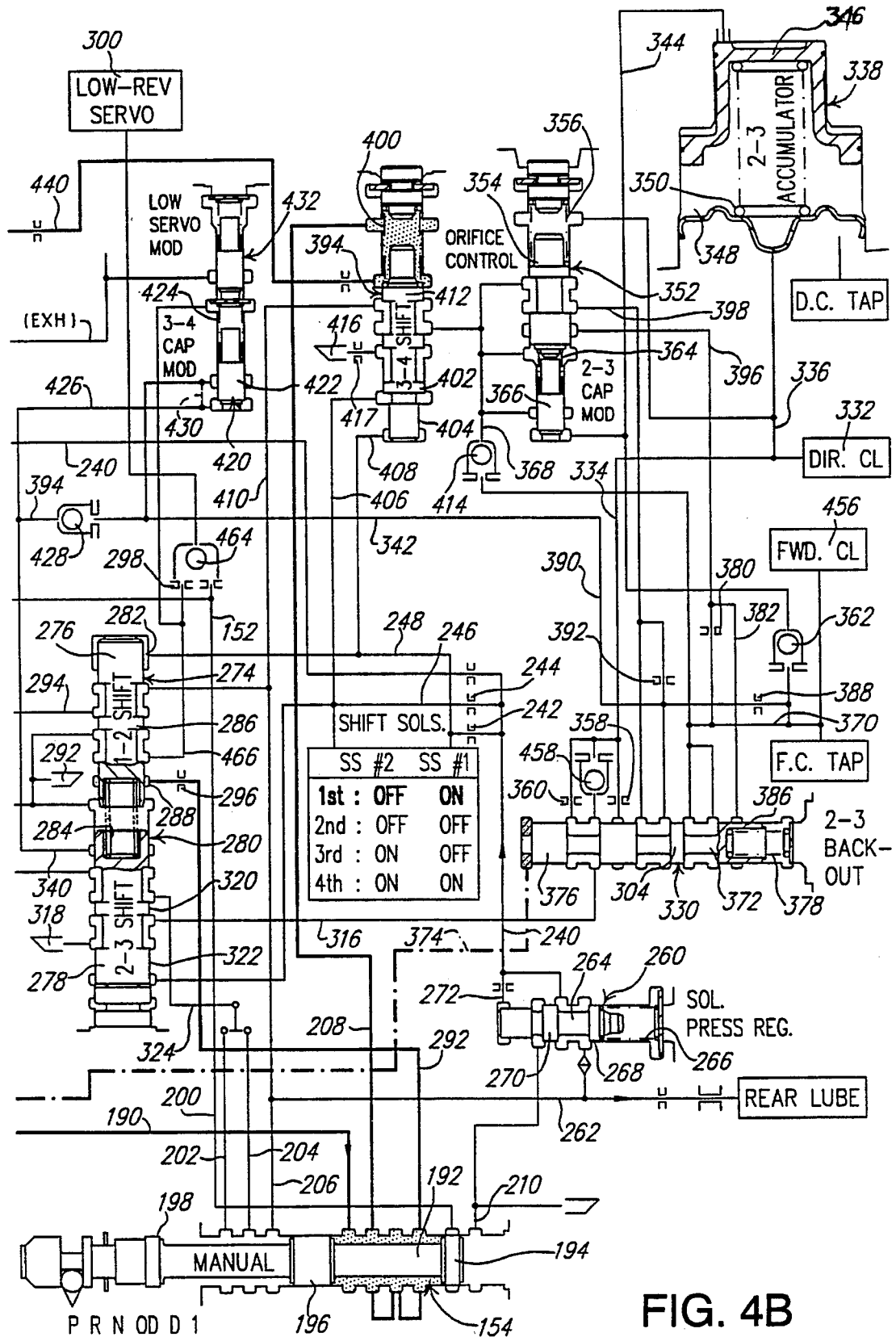

Shown in FIGS. 4, 4A and 4B is a valve circuit illustrated in schematic form. FIGS. 4A and 4B are enlargements of FIG. 4. The valve elements in the valve circuit of FIG. 4 are in the positions they assume when the transmission is in park, the engine throttle is closed and the converter clutch is off.

The circuit of FIGS. 4, 4A and 4B includes a main regulator valve and booster shown at 124. This valve regulates line pressure from engine driven pump 126.

The main regulator valve 124 determines the line pressure in line pressure passage 128. It responds to an electronic pressure control output delivered to the main regulator 124 through line 130. This pressure is developed by the electronic pressure control solenoid valve 114, as will be described subsequently.

As seen in FIG. 4A, main regulator valve 124 comprises a valve spool 132 having spaced lands 134, 136, 138 and 140. These lands register with internal lands in the main regulator valve bore as shown. A booster valve spool 142 is situated in a sleeve in the main regulator valve bore. The booster valve sleeve provides a seat for main regulator valve spring 144, which tends to urge the main regulator valve spool 132 in an upward direction against the opposing force of line pressure acting on the upper end of land 140 as shown at 146.

The lower end of land 134 is subjected to the pressure in the electronic pressure control line 130, thus producing a force that assists the spring 144.

Booster valve spool 142 has a land 148 that is subjected to pressure delivered to the booster valve spool through reverse line pressure line 150, which in turn communicates with reverse line pressure passage 152. Passage 152 extends to the manual valve generally indicated at 154 in FIG. 4B. The manual valve will establish pressure distribution to line 152 when the manual valve assumes the reverse drive position R.

The main regulator valve distributes pressure to the converter and lubrication circuits through passage 156, as seen in FIG. 4A. Valve land 136 establishes controlled communication between line pressure passage 128 and passage 156 in response to the pressure and spring forces acting on the regulator valve spool. The magnitude of the pressure in passage 128 is determined by the regulating action of land 134 which establishes controlled communication between passage 128 and return passage 158 leading to the intake side of the pump 126.

The main regulator valve 124 regulates line pressure by exhausting a proper amount of oil from the pump outlet line 128. When the valve spool 132 is in its uppermost position, the pressure will rise until it is limited by either leakage or available power input to the pump. At the other extreme position of the regulator valve spool, the valve is fully opened and all pump flow is exhausted. The valve spool 132 will automatically position itself between these two extremes, thus creating a variable restriction by exhausting the proper amount of oil into line 158 to maintain the desired pressure. A pressure increase occurs as the valve moves upwardly in response to a pressure signal from the electronic pressure control solenoid.

The regulator valve regulates the position of the valve spool by balancing electronic pressure control output pressure in line 130 and the force of the spring against the line pressure force acting at the upper end of the valve on land end 146. If the line pressure is less than the desired amount or if the electronic pressure control pressure in line 130 increases, the force balance is upset and the pressure signal from the electronic pressure control solenoid and the spring force will move the valve upwardly, thus reducing the exhaust flow and increasing the line pressure. The converse action will occur if the line pressure is too high or if the electronic pressure control signal in line 130 is decreased.

The regulator valve will respond continuously to changes in pump flow to cause a readjustment of the position of the valve to maintain a preset balance. A decrease in pump flow, or an increased demand for pump flow, during clutch application for example, will cause the valve to close slightly and exhaust less oil in order to maintain the desired pressure.

When the engine is started, the main regulator valve opens to a point where the flow is delivered first to the converter circuit through line 156. This flow goes through the converter limit and bypass control valves into the converter and lubrication circuits. These circuits are charged quickly and the regulator valve opens further until the flow is exhausted into the passage 158 which recirculates the oil back to the pump intake. If there is not sufficient pump flow to satisfy the flow demands for both line pressure and converter pressure, the main regulator valve will prioritize the pump flow to maintain the scheduled line pressure.

The line pressure acting on land end 146 is routed through orifice 160, which dampens rapid valve movements which would cause pressure oscillations.

The main regulator valve spring 144 prevents line pressure from being too low at low output pressures of the electronic pressure control solenoid. If the electronic pressure control signal in line 130 is above a predetermined valve, such as 19 psi, the booster valve is shifted downwardly into a sleeve 162 so that it does not contact the main regulator valve spool 132. When the output of the electronic pressure control solenoid is less than 19 psi, for example, the booster valve will contact the main regulator valve spool.

During reverse drive, passage 150 is pressurized as mentioned earlier. The force of that pressure is added to the force of the booster valve spring.

Oil from the torque converter passes through line 164 to drain back valve 166, which comprises a movable single-diameter valve element 168. This valve element is urged downward under its own weight in a valve chamber to control the effective flow through drain back orifice 170. The output flow from the drain back valve passes through line 172 to the transmission oil cooler 174. When the engine is turned off, the weight of the valve seats to block the oil from draining out of the converter through line 164.

The converter pressure limit valve shown at 176 limits the pressure of the converter circuit by controlling the amount of oil delivered to the converter through line 156 by the main regulator valve. At lower pressures, the valve is held in an uppermost position by valve spring 178 acting on converter pressure regulator valve element 180. Converter charge pressure then flows freely to converter feed line 182 through the space between adjacent lands 184 and 186. If the converter charge pressure in line 182 rises above a predetermined value, the valve spool 180 will be forced outwardly by reason of the pressure acting between lands 186 and 188. The magnitude of the pressure in passage 182 then will be regulated at a value determined by the spring force.

The manual valve 154, seen in FIG. 4B, receives line pressure through passage 190, which communicates with line pressure passage 128 described previously. The manual valve 154 includes a driver-controlled valve spool 192 having spaced lands 194, 196 and 198. The valve spool has several positions that may be selected by the operator. These positions are determined by detents and are identified in FIGS. 4 and 4B by the symbols P, R, N, OD, D and 1, which respectively identify the Park position, the Reverse position, the Neutral position, the Overdrive drive range position, the three-speed ratio D range position, and the manual low range position. The valve is actuated by a driver-operated manual shift valve linkage. When the valve spool 192 is positioned as shown in FIG. 4B, the valve circuit is conditioned for park.

Line pressure from passage 190 is transferred through the space between lands 196 and 198 to the reverse drive circuit through passage 200, to the overdrive circuit through passage 202, passage 204 and passage 206, to the three-speed ratio drive range circuit through passage 204 and 206 and to the manual low drive range circuit through passage 206.

Passage 208 is pressurized by the manual valve when it assumes the park position, the D position, the reverse position or the "1" position.

Line 210 is an exhaust passage located between the lands 196 and 194.

The bypass clutch control valve, which is generally indicated at 212, comprises a movable valve spool 214 with equal diameter spaced valve lands 216, 218 and 220. A larger diameter valve land 222 provides a differential area on which bypass clutch pressure in passage 224 acts.

The bypass clutch control valve controls the operation of the converter bypass clutch. When the clutch is not engaged, pressure from passage 182, described previously, is distributed through the bypass clutch control valve to the converter supply line 226 and to the bypass clutch supply line 224. The modulated converter clutch control solenoid is off at that time, as will be explained subsequently.

When the bypass clutch control valve spool 214 is in an upward position, the clutch piston plate, shown at 42 and 44 in FIG. 1, is held out of engagement with respect to the adjacent friction surface of the impeller housing 26. All of the torque delivered to the gearing from the engine then is delivered hydrokinetically.

The converter clutch is engaged, upon actuation of the modulated converter clutch control solenoid, as the bypass clutch control valve element 214 moves downwardly under the influence of modulated converter clutch solenoid pressure in passage 228, which acts on the upper end of the land 216. The valve spool 214 then regulates the pressure in passage 224, which extends to the bypass clutch, the magnitude of the pressure in passage 224 being determined by the magnitude of the modulated converter clutch solenoid pressure in passage 228 and by the pressure in passage 182.

The microprocessor monitors continuously the torque converter slip and continuously adjusts the magnitude of the modulated converter clutch solenoid duty cycle to achieve the desired output pressure in passage 228 so that the slip is controlled to a predetermined value.

Line 164 returns oil from the torque converter to the cooler through the drain back valve as explained previously. When the bypass clutch is not engaged, oil flows freely through the bypass valve from the line 164 to the cooler circuit. When the valve is engaged, the oil flow is restricted by orifice 230.

When the modulated converter clutch solenoid is de-energized, its output pressure in line 228 is zero and the bypass clutch control valve is moved upwardly by valve spring 232 and by pressure from passage 182 acting on the end of valve plunger 234 located at the lower end of the bypass clutch control valve and directly engaging the bypass clutch control element. The pressure in passage 182, as explained previously, is limited by the converter pressure limit valve.

When the modulated converter clutch solenoid is off, oil flows freely from passage 182 to passage 224 and through flow restricting orifice 236 to the converter impeller circuit line 226. This is done to restrict the flow in passage 226 so that the converter clutch will not drift on when clutch application is not desired.

The converter turbine circuit, which includes lines 164, carries oil from the converter to the cooler and the lubrication circuit as explained previously. During open converter operation, the flow passes unrestricted through the bypass clutch control valve and the drain back valve.

When the modulated converter clutch solenoid is actuated, a modulated pressure is developed in passage 228. A pressure in excess of 6 psi, in a preferred embodiment, is required to overcome the force of the valve spring 232. When the bypass clutch control valve is in its modulating position, flow from line 182 to the bypass clutch supply passage 224 is bypassed and fluid flow is unrestricted into the converter impeller circuit through line 226 to maintain full pressure on the rear of the converter clutch piston shown at 42 and 44.

Converter bypass pressure acts on the opposite side of the piston, as shown at 42 and 44, and is regulated by the bypass clutch control valve as a function of the pressure in the passage 228 and by the force of the spring 232 and the force of pressure from passages 182 acting on valve plunger 234.

The microprocessor, during modulation of the pressure in passage 224, calculates turbine speed from the output shaft speed and the gear ratio and compares that value with the engine speed to determine converter slip. The pressure in passage 228 is continuously adjusted to maintain the desired slip. To reduce the slip, the microprocessor commands a higher value of pressure in passage 228 which reduces the pressure in passage 224, thus increasing the clutch torque capacity. To eliminate slip, the microprocessor can command a maximum pressure in passage 228. The solenoid acts with a 100% duty cycle at that time, thus moving the bypass clutch control valve downwardly to maintain the pressure in passage 224 at a zero value since it is brought into communication with exhaust port 238.

The shift solenoids SS1 and SS2 are illustrated in FIG. 4B in block diagram form. They are identical in form, as will be explained subsequently with reference to FIGS. 11 and 11A.

Solenoid SS1 is fed with pressure from solenoid supply passage 240 through a flow control orifice 242. Solenoid SS2 is supplied with solenoid supply pressure from passage 240 through orifice 244. The solenoid supply line for the solenoid SS2 on the downstream side of the orifice 244 is shown at 246. The corresponding supply line for solenoid SS1 is shown at 248. When the shift solenoid is deenergized, the flow through the orifice is exhausted and the output pressure for solenoid S1 or S2 is zero. When the solenoid is energized, however, the solenoid blocks the flow and the solenoid output pressure rises until it equals supply pressure.

Referring next to FIGS. 11 and 11A, solenoid SS1, which is identified by numeral 120, includes electrical windings 250 and an armature 252. (Since solenoid SS2 is similar to solenoid SS1, FIGS. 11 and 11A may be considered to apply also to solenoid SS2.) The armature engages ball valve element 254, which acts on and registers with an orifice formed in valve seat 256. Solenoid spring 258 urges normally the armature 252 in an upward direction. When the solenoid is off, valve 254 moves off its seat thereby exhausting pressure from supply line 248 to an exhaust port 260.

When the solenoid 120 is energized, the armature 252 moves to the position shown in FIG. 11A, thereby seating ball valve element 254 against its valve seat and interrupting communication between passage 248 and exhaust port 260. This causes a shift signal that will be utilized by the shift valve elements to be described subsequently.

The pressure supplied to the shift solenoids through passage 240 is obtained from solenoid pressure regulator valve 260 shown in FIG. 4B. Pressure is distributed to the valve 260 through supply line 262 which is pressurized by the manual valve when the manual valve is in the overdrive position, the D position, or the 1 position.

The valve 260 includes a regulator valve element 264, which is urged in a left-hand direction by valve spring 266. Valve element 264 has pressure regulating valve lands 268 and 270 which control communication between passage 262 and passage 240. A feedback branch passage 272 acts on the left-hand end of the solenoid pressure regulator valve spool 264. Thus, the pressure in passage 240 is functionally related to the spring force of valve spring 266. The pressure in passage 240 is a constant value in all forward drive ranges. Passage 240 also supplies a modulated converter clutch solenoid 116 with supply pressure as will be explained subsequently.

The 1-2 shift valve is identified in FIG. 4B by reference numeral 274. It includes a shiftable valve element 276 which is located in direct alignment with valve element 278 for the 2-3 shift valve generally indicated at 280. The 1-2 shift valve controls ratio changes between first and second gears. When the first solenoid SS1 is energized, solenoid pressure is developed in line 248, as explained previously. This pressure is distributed to the upper end of land 282 thereby shifting the valve spool 276 downwardly against the opposing force of valve spring 284. That spring is effective also on valve land 278 for the 2-3 shift valve 280.

The 1-2 shift valve includes also lands 286 and 288.

Passage 206 which is pressurized during operation in the overdrive range, the D range and the manual low range is blocked by land 282 during first ratio operation. All of the output circuits are exhausted through exhaust port 290. Thus, line 294 which extends to the intermediate clutch and the overdrive servo supply, is exhausted.

Passage 292 which is pressurized by the manual valve in the park, manual-low range and reverse drive positions of the manual valve distributes pressure through orifice 296, through the space between lands 286 and 288 and through check valve 298 to the low and reverse servo 300. When the 1-2 shift is initiated by the processor, shift solenoid SS1 is deactivated and the 1-2 shift valve is moved by the valve spring upwardly. Pressure from passage 206 then is delivered directly to the line 294 which distributes pressure through passage 302 to the intermediate clutch 304. Communication between passage 294 and passage 302 is established by orifice 306. Pressure is delivered also to the 1-2 accumulator through passage 308. Pressure also is delivered at that time from passage 294 through flow control orifice 310 to passage 312 leading to the overdrive servo regulator valve generally identified by reference numeral 314.

The 2-3 shift valve 280 controls shifting between the second ratio and the third ratio. During operation in the second ratio, shift solenoid SS1 and shift solenoid SS2 are off and the spring holds the 2-3 shift valve element 278 in a downward position. It also holds the 1-2 shift valve element 276 in an upward position. Direct clutch feed line 316 during second ratio operation is exhausted through exhaust port 318, the latter communicating with line 316 through the space between lands 320 and 322 on the 2-3 shift valve spool 278. When the manual valve is in the overdrive range or the D range, oil from the manual valve flows through the 2-3 shift valve from passage 324 to the release side of the overdrive servo 326. Communication between the 2-3 shift valve and the release side of the overdrive servo is obtained from overdrive release feed passage 328. This assures that the overdrive servo will remain off even when the apply side of the overdrive servo is pressurized. In manual-low (1) drive range, the overdrive servo release pressure is exhausted through the manual valve and through passage 204, passage 324 and passage 328 so that when the overdrive servo apply chamber is pressurized, the overdrive servo will be activated.

A ratio change to the third gear is obtained when the processor turns on shift solenoid 2 while shift solenoid 1 remains off. Shift solenoid pressure then is distributed to the lower end of land 320 of the 2-3 shift valve and moves the 2-3 shift valve upward. Pressurized oil from the manual valve passes through passage 324 to passage 316, which leads to the 2-3 backout valve generally identified by reference numeral 330. That pressurized fluid then passes directly through the 2-3 backout valve to the direct clutch 332 through passage 334. Pressurized fluid in the direct clutch 332 is transferred to the 2-3 accumulator through passage 336. The 2-3 accumulator is identified generally by reference numeral 338. The pressure then is distributed to the overdrive servo release chamber through passage 328 and to the overdrive release circuit from passage 340 instead of being connected to the passage 324 leading to the manual valve. This is done to prepare for a 3-4 upshift.

A 2-3 capacity modulator valve is identified generally by reference numeral 342. This valve, during a 2-3 upshift, regulates the pressure in passage 344 extending to the upper side of the piston 346 of the 2-3 accumulator 338. This then controls the direct clutch pressure on the bottom side of the accumulator piston 346. The pressure in passage 344 opposes the force of accumulator valve spring 350.

The 2-3 capacity modulator valve 342 is situated in a common valve bore and acts in cooperation with the orifice control valve 352, which comprises a valve spool 354 that is urged downwardly by valve spring 356 and the direct clutch pressure in passage 336 during a 2-3 upshift.

The direct clutch pressure in the chamber 348 is determined by the regulated pressure at the top of the 2-3 accumulator piston 346. During a 2-3 upshift, pressurized fluid from the 2-3 shift valve flows through orifice 358 or orifice 360, depending upon the position of the 2-3 backout valve, to the direct clutch 332. This strokes the 2-3 accumulator piston 346 in an upward direction. Prior to the 2-3 shift, the accumulator piston assumes the downward position under the influence of the forward clutch pressure on top of the piston in the first and second ratio. As the 2-3 accumulator piston 346 strokes, the force balance on the piston control affects clutch pressure. Direct clutch pressure added to the 2-3 accumulator spring force moves the accumulator piston 346 upward, thereby forcing oil out of the accumulator through line 344. This causes ball check valve 362 to close. This forces oil to flow through the 2-3 capacity modulator valve, which regulates the accumulator back pressure to a higher value than the line pressure.

The 2-3 capacity modulator valve has a valve spring 364 which urges the 2-3 capacity modulator valve spool 366 downward thereby providing controlled communication between passage 344 and passage 368, which communicates with the 2-3 capacity modulator valve element 366 and with the forward clutch feed line 370.

The 2-3 backout valve 330 has a multiple land valve spool 372. The output pressure of the electronic pressure control solenoid valve 114 is distributed through line 374 to the left-hand end of valve land 376 of the backout valve 330. The force developed by the electronic pressure control solenoid pressure in passage 374 is opposed by backout valve spring 378.

During a 2-3 shift, the 2-3 backout valve feeds pressurized oil to the direct clutch 332 through either orifice 358 or orifice 360. Normally, orifice 358 is the feed orifice during part throttle operation and orifice 360 is the feed orifice during closed throttle operation. However, since the line pressure established by the EPC control solenoid 114, which is controlled by the processor 92, may be affected by factors in addition to throttle pressure, part throttle 2-3 shifts may use orifice 360 in some cases and orifice 358 in other cases.

The 2-3 backout valve, in combination with the orifice control valve 352, controls the apply rate of the forward clutch and the overdrive servo release. During a closed throttle forward engagement of the forward clutch, the forward clutch and the 2-3 accumulator are pressurized through the orifice 380. During power-on engagements, the orifice 380 is bypassed and the feed rate to the forward clutch is unrestricted. Thus, oil will be transferred through passage 382, bypassing the orifice 380, and through the space between backout valve lands 384 and 386 to the forward clutch.

During a 4-3 coasting downshift, the forward clutch is applied slowly as apply pressure passes through control orifice 388 located in the forward clutch feed line 370. Simultaneously, the flow to the overdrive servo release through passage 328, which is fed through the 2-3 shift valve from passages 390 and 340, is unrestricted and the release occurs quickly.

During a power-on 4-3 downshift when the backout valve element 372 is shifted in a right-hand direction, the flow to the forward clutch and to the overdrive servo release are combined and fed through a common orifice 392. The feed line 328 for the overdrive servo release communicates with passage 394. Passage 394 communicates with line 370, which is the feed line for the forward clutch.

It is the function of the orifice control valve 352 to control the application rate for the forward clutch. Passage 368 extending from the 3-4 shift valve 394 holds the orifice control valve spool in an upward position during first and second gear ratio operation. Further, the pressure in passage 368 is transferred through the orifice control valve 352 to passage 396, which is the feed passage for the forward clutch in first and second gear.

The left end of land 376 of the 2-3 back-out valve 230 is subjected to electronic pressure control solenoid pressure in passage 374.

Shown in FIG. 5 is a diagram that summarizes the orifices that are in place as the 2-3 back-out valve functions. This 2-3 back-out valve logic will introduce orifice 380 in the fluid flow path leading to the forward clutch through passage 370 during the engagement logic for the forward clutch. On the other hand, as indicated in the logic diagram of FIG. 5, the fluid flow path to the overdrive release servo is a free flow path with no control orifice.

The 4-2 kickdown logic, as indicated in the logic diagram of FIG. 5, does not result in the introduction of a flow control orifice by the 2-3 back-out valve into the feed flow paths for the forward clutch and the overdrive release side of the overdrive servo.

During a coasting 4-3 downshift, the logic will result in introduction of orifice 388 into the flow path to the forward clutch through passage 390. The flow path to the overdrive release side of the overdrive servo, however, is free of a flow restricting orifice as indicated in the chart of FIG. 5.

During a power-on 4-3 downshift, the 2-3 back-out logic diagram of FIG. 5 indicates that the forward clutch is fed through orifice 392 from passage 398. The fluid flow path to the release side of the overdrive servo is also on the downstream side of the orifice 392. It is apparent from FIG. 5 that on a coasting 4-3 downshift, the overdrive release will be pressurized to release the overdrive brake much sooner during a coasting downshift than in the case of a torque demand downshift, where the overdrive release side of the overdrive servo must be fed with oil through the orifice 392.

During fourth ratio engagement of the overdrive servo on a 3-4 shift, both the forward clutch and the overdrive release side of the overdrive servo must be exhausted. In the case of the forward clutch and the overdrive servo release, the exhaust will occur across orifice 417 located at the 3-4 shift valve. The overdrive servo release pressure, however, must be regulated by 3-4 capacity modulator valve 420 and bled through gasket bleed orifice 430 and a bleed orifice in the servo release cavity. Thus, the overdrive release has three flow paths, one path through the 3-4 capacity modulator valve, one path through the orifice 430 before merging with forward clutch fluid and passing through orifice 417 and one path directly to exhaust in the servo cavity.

During operation in the third and fourth ratios, the direct clutch pressure, plus the force of valve spring 356 for the orifice control valve 352, moves the valve element 354 downward and flow from the 3-4 shift valve is transferred through the valve 352 to passage 398, which is the source of pressure for the forward clutch and the overdrive servo release during third ratio and fourth ratio operation.

The 3-4 shift valve 394 controls shifting between the third ratio and the fourth ratio. During operation in the first, second and third ratios, the 3-4 shift valve is held in a downward position by valve spring 400. Pressure from the shift solenoid 2 is distributed to the differential area of lands 402 and 404 on the 3-4 shift valve through passage 406. Similarly, output pressure from shift solenoid 1 is distributed to the lower end of the land 404 through passage 408. Neither the pressure in passage 408 nor the pressure in passage 406 is sufficient by itself to move the 3-4 shift valve upwardly against the force of the spring 400. Line pressure from passage 410, which is the same as the pressure in passage 262, is transferred through the 394 shift valve to the orifice control valve since the two are hydraulically connected through passage 368. Passage 410 then becomes the source of pressure for the forward clutch. Further, it is a source of pressure during third ratio and fourth ratio operation for the overdrive servo release.

A ratio shift to the fourth ratio from the third ratio requires both shift solenoids SS1 and SS2 to be energized. The pressures acting on the lower end of the land 404 and on the differential area of lands 404 and 402 then is sufficient to move the spool valve element 412 for the 3-4 shift valve 394 in an upward direction. This conditions the transmission for fourth ratio operation. Forward clutch pressure and overdrive servo release pressure during power-on 3-4 shifts then are exhausted through check valve 414 and through exhaust port 416 in the 3-4 shift valve 394. For closed throttle 4-3 shifts, the servo release pressure does not flow through check valve 414. A control orifice 417 is located at the exhaust port 416. The overdrive servo piston then applies as pressure builds up in the servo apply side of the overdrive servo. The rate of pressure build up is controlled by orifice 310 in the passage 312.

The 3-4 capacity modulator valve 420 is a simple pressure regulator comprising a valve spool 422, which is urged downwardly by valve spring 424. It functions to regulate the release of pressure of the overdrive servo during 3-4 upshifts. The overdrive release pressure is distributed to the lower end of the valve element 422 through passage 426, which extends to the overdrive release passage 328 in third and fourth ratios. Passage 328 and passage 426 communicate with each other through passage 340 and the 2-3 shift valve.

As the overdrive servo applies during a 3-4 shift, the flow from the release side of the servo seats the ball check valve 428 so the release oil is forced to flow through the 3-4 capacity modulator valve through passage 426.

A small bleed passage is used to bypass the 3-4 capacity modulator valve as shown at 430 to keep the overdrive servo release pressure during steady-state operation at zero so as not to compromise the overdrive band static capacity. A second bleed exists in the servo release cavity for the same reason.

The low servo modulator valve, generally identified by reference numeral 432, regulates the pressure distributed to the low-and-reverse brake band servo 300 during first gear manual operation. The manual low drive range fluid flow from the 1-2 shift valve and through the orifice 296, described previously, is regulated during first gear operation in the manual low range by the valve 432. Valve 432 is a simple regulator that modifies the rate of application of the pressure to the servo 300.

The overdrive servo regulator valve 314 functions to regulate at a constant apply pressure for the overdrive servo 326 in third gear and second gear of the overdrive range in order to smooth the 4-3 power-on downshifts. Overdrive servo apply pressure acts on the lower end of land 436 and balances the spring force. The valve is supplied from the 1-2 shift valve through passage 294, which is line pressure in second, third and fourth gear ratios.

During fourth ratio operation, pressure from the 3-4 shift valve is distributed to passage 440 and urges the valve spool 438 downward to prevent it from regulating so that the overdrive servo apply pressure equals line pressure. It functions in this manner also during manual low operation so that overdrive servo apply pressure is the same as line pressure whenever the servo apply chamber is pressurized.

The 1-2 accumulator is generally identified by reference numeral 446 and includes a double-acting piston 448 having an upper pressure chamber 450 and a lower pressure chamber 452. Intermediate clutch pressure during a 1-2 shift, as explained earlier, is distributed to the chamber 452 through passage 308. Line pressure is delivered to the upper chamber 450 through line passage 454. This cushions the application of the intermediate clutch. The uppermost chamber of the 1-2 accumulator is exhausted. It could be pressurized, however, if it is desired to further modify the intermediate clutch pressure during a 1-2 shift.

The 2-3 accumulator, which was described with reference to the engagement of the forward clutch, functions also to cushion the engagement of the direct clutch during a 2-3 shift. The direct clutch 332 communicates with the lower side of the piston 346 during direct clutch engagement and the forward clutch 456 communicates with the upper side of the accumulator piston 346.

The control scheme has eight check valves. These include valve 362 previously described, valve 414 previously described, check valve 458 associated with the 2-3 backout valve, previously described valve 428, a valve 460 associated with the reverse clutch 462, and a check valve 464 which actually is a shuttle valve disposed between the low and reverse servo 300 and reverse servo feed line 200 and between the low and reverse servo 300 and the feed line 466 extending to the 1-2 shift valve. The seventh check valve is shown at 468 and the eighth check valve is shown at 470.

Check valve 362 seats during a 2-3 shift thereby forcing the 2-3 accumulator back pressure to flow past the 2-3 capacity modulator valve. During a 3-2 downshift and during a forward clutch engagement, forward clutch flow unseats the ball and flows to the accumulator.

Check valve 414 seats when the forward clutch is being applied thereby forcing the fluid to flow through the appropriate orifice. During a 3-4 shift and during a disengagement to effect neutral, forward clutch fluid flows freely past the valve 414 thus bypassing all of the orifices.

Check valve 458 seats during a 2-3 shift to force the direct clutch flow to go through either orifice 358 or orifice 458, depending upon the position of the 2-3 backout valve. During a 3-2 downshift direct clutch pressure flows freely past the check valve 458, thus bypassing the orifices.

Check valve 428 seats during a 3-4 shift, thus forcing the overdrive servo release flow to go past the 3-4 capacity modulator valve 420. On a 4-3 shift, oil flows freely past the valve 428.

Check valve 460 seats during reverse engagement thus forcing the reverse supply fluid to flow through orifice 472. When the reverse clutch is released, fluid from the reverse clutch exhausts freely through the valve 460.

Shuttle valve 464 applies the low-and-reverse servo from either the reverse circuit or the 1-2 shift valve.

Check valve 468 prevents the distribution of pressure to the converter clutch during first gear operation if for some reason the modulated converter clutch solenoid should malfunction during operation in first gear. The ball is seated in second gear, third gear and fourth gear operation.

Check valve 470 seats during a 1-2 shift. This forces the intermediate clutch fluid, upon clutch application, to flow through the control orifice 306. On a 2-1 downshift, a second orifice exhaust path through the orifice 474 is added to the exhaust flow path.

FIG. 4A shows the converter circuit and the bypass clutch control when the transmission is in the neutral and park ranges at light throttle. In this instance, the bypass clutch control valve 212 is in an upward position. Regulated pressure then is distributed to the converter impeller circuit and also to the bypass circuit through passages 226 and 224, respectively. Fluid is distributed from the main regulator valve through the converter pressure limit valve 176, which assumes an upward position. It is transferred then through the bypass clutch control valve directly into the passages 226 and 224. Fluid returns from the converter turbine circuit through passage 164 and then through the open drain back valve to the cooler 174.

In reverse-drive, part-throttle, open-converter operation, the bypass clutch control is in an upward position, the solenoid pressure regulator valve 260 is in a left-hand position, the 2-3 backout valve is shifted to the right by the electronic pressure control output pressure in passage 374, the 3-4 shift valve element 412 is shifted to a downward position and actuating pressure is distributed to the low-and-reverse servo 300.

The valve spring 284 moves the 1-2 shift valve element to its upper position and moves the 2-3 shift valve element to its lower position.

Reverse pressure is distributed to the reverse clutch through passage 200 from the manual valve 154.

During neutral, closed-throttle, open-converter operation, line pressure from the manual valve, when the manual valve assumes the neutral position, is distributed through lines 190 and 156, through the converter pressure limit valve and through the bypass clutch control valve to the converter impeller and bypass clutch circuits. The 2-3 shift valve moves down, as described earlier, and the 1-2 shift valve element moves up, as described earlier. Pressure distribution to all of the servos and clutches is interrupted. The 2-3 backout valve and the solenoid pressure regulator valve move to their left-hand positions.

During first-gear, closed-throttle, open-converter operation. In this case, the manual valve delivers line pressure through the 2-3 shift valve, which is moved in a downward direction, to the feed passage 328 for the release side of the overdrive servo. Line pressure is distributed also to the forward clutch from the 3-4 shift valve, which assumes its downward position. The 3-4 shift valve is supplied with fluid from the manual valve through passage 410.

During overdrive operation, the upper working chamber of the 2-3 accumulator piston is pressurized. The orifice control valve is shifted upward and the 2-3 capacity modulator valve is shifted downward, thereby establishing fluid communication between the outlet side of the 3-4 shift valve and the forward clutch.

The shift solenoid SS2 is off and the shift solenoid SS1 is on. This causes the 1-2 shift valve to move downward, which in turn forces the 2-3 shift valve to move downward because the two valves are connected mechanically, one with respect to the other.

During overdrive, second-gear, part-throttle, open-converter operation, the 1-2 accumulator has both pressure chambers pressurized. Both shift solenoids SS1 and SS2 are de-energized. The manual valve then distributes pressure to the 3-4 shift valve, which transfers it to the forward clutch through the orifice control valve. The manual valve also distributes pressure to the 1-2 shift valve, which distributes it through the orifice 306 to the intermediate clutch.

During overdrive, third gear operation when the converter is modulating, rather than being open, the bypass clutch control is moved inward under the influence of pressure delivered to it from the modulating converter clutch solenoid. Thus, pressure is distributed through the bypass clutch control valve through bypass clutch feed passage 224. The magnitude of the pressure in passage 224 is determined by the duty cycle of the modulated converter clutch solenoid and the pressure in passage 228 delivered to the upper land 216 of the bypass clutch control valve.

Pressure from the manual valve is delivered directly to the release side of the overdrive servo and to the direct clutch through the 2-3 backout valve. The 2-3 backout valve is shifted in a right-hand direction by the electronic pressure control signal in passage 374.

The shift solenoid SS1 is deactivated and shift solenoid SS2 is activated. A modulated converter clutch solenoid receives signals of varying pulse width. When the shift solenoid 2 is activated, oil pressure is delivered to the 2-3 shift valve and the 3-4 shift valve. The 2-3 shift valve shifts upward against the opposing force of the valve spring while the 1-2 shift valve remains upshifted in an upward direction. Oil for the manual valve then flows to the direct clutch and to the 2-3 accumulator by way of the 2-3 backout valve.

The pressure from the shift solenoid SS2 is not enough in itself to move the 3-4 shift valve, so it is held in the position shown in FIG. 4B.

During light throttle operation, the 2-3 backout valve feeds the direct clutch through the orifice 360. During heavy throttle operation, the 2-3 backout valve is shifted to the right, thereby forcing supply oil to be directed through the orifice 358.

During overdrive, fourth gear, part throttle, open-converter operation, the duty cycle of the modulated converter clutch solenoid can be increased to force the bypass clutch control to its downward position when full clutch application (no slip) is desired. Modified pressure from the modulated converter clutch solenoid will effect a controlled slip as explained previously. The duty cycle commanded by the processor then is greater than zero, but it is less than 100%.

During operation in drive range D, third gear, part throttle operation with a modulated converter clutch, 2-3 shift valve, the 3-4 shift valve and both the apply and release side of the overdrive servo are pressurized and the servo is released. The 3-4 shift valve is moved downward. Solenoid pressure shifts the 2-3 shift valve and the 1-2 shift valve in an upward direction. This will cause the forward clutch and the direct clutch to be applied as well as the intermediate clutch.

During first ratio operation in the manual low range with a closed throttle and an open converter, the solenoid SS2 is released and the solenoid SS1 is applied. Thus the 1-2 shift valve is moved downward. That forces the 2-3 shift valve also to move downward. The low-and-reverse servo is applied as pressure is distributed through the 1-2 shift valve from the manual valve. The 2-3 capacity modulator valve is forced to its lower position and the orifice control valve is forced to its upper position. The feed of fluid to the forward clutch is through orifice 380.

During operation in second gear in the manual drive range with part throttle and an open converter, the overdrive servo apply chamber is pressurized and the 1-2 shift valve is moved upward, thus permitting pressure from the manual valve to be distributed to the overdrive servo regulator valve and to the 1-2 accumulator and through the orifice 306 to the intermediate clutch. Both shift solenoids are turned off by the processor. The modulated converter clutch solenoid is turned off and the converter clutch released. This is true also for first gear.

When the vehicle first is started and the manual lever is moved to the overdrive range position and the vehicle is at rest, the valves control the engagement of the forward clutch. Soft engagement is assured by the fluid delivery from the orifice control valve through the flow control orifice 380. The 2-3 accumulator also is pressurized to cushion the shift as fluid from the feed line 370 for the forward clutch is distributed through the check valve 362 to the upper end of the accumulator chamber.

When the reverse clutch is being engaged following movement of the manual valve from the neutral to the reverse position, the manual valve delivers line pressure to the low and reverse servo and to the reverse clutch, the rate of application of the reverse clutch being controlled by the orifice 472. Check valve 464 provides communication between the manual valve and the feed line for the low and reverse servo. Shift solenoid SS1 is on and shift solenoid SS2 is off.

When operating in overdrive range as a 1-2 shift is occurring with part throttle, the manual valve delivers fluid through the 1-2 shift valve, which assumes the upward position under the influence of the 1-2 shift valve spring. The intermediate clutch is fed then by the 1-2 shift valve through the orifice 306. The pressure made available to the intermediate clutch acts on the lower side of the 1-2 accumulator piston 448. With line pressure acting on the middle area of the piston 448, the application of the intermediate clutch is cushioned.

In the overdrive range as the valves are causing a 2-3 shift with part throttle, forward clutch pressure is distributed through the 3-4 shift valve, which assumes a downward position. It assumes a downward position also during a 1-2 shift. The 2-3 shift valve moves upwardly because solenoid pressure acts on the lower end of the 2-3 shift valve. The shift solenoid SS2 is on at this time and the shift solenoid SS1 is off. Upward movement of the 2-3 shift valve holds the 1-2 shift valve up because, as explained earlier, they are connected mechanically, one with respect to the other. Overdrive release pressure is distributed through passage 328 from the 2-3 shift valve as explained previously. The intermediate clutch is pressurized as feed line 302 is brought into communication through 1-2 shift valve with line pressure passage 206 which extends to the manual valve.

During operation in overdrive range while a 3-4 upshift is taking place at part throttle, line pressure is distributed through the 1-2 shift valve which, together with the 2-3 shift valve, moves to the upward position because of the solenoid actuating pressure. The overdrive servo regulator valve moves downward thus establishing communication between the 1-2 shift valve passage 294 and the apply side of the overdrive servo.

Both shift solenoids SS1 and SS2 are applied. Both shift solenoid valve pressures then are sufficient when they act on the 3-4 shift valve to move the 3-4 valve against the force of the valve spring for the 3-4 shift valve. The 3-4 shift valve thus is able to direct fluid to the overdrive servo regulator valve through passage 440. This keeps the overdrive servo regulator valve from regulating, thus allowing full line pressure to be distributed to the apply side of the overdrive servo. The 3-4 capacity modulator valve 420 softens the 3-4 shift by regulating the pressure on the release side of the overdrive brake band as fluid is displaced from the servo through the passage 328. The pressure on the forward clutch is exhausted through the check valve 414 and through the 3-4 shift valve at this time.

During overdrive operation as a 4-3 coasting downshift occurs with a closed throttle, the backout valve 330 assumes a left-hand position as explained previously because the electronic pressure control solenoid valve output pressure is a minimum at that time. The 3-4 shift valve moves downward because shift solenoid SS1 is deactivated and the remaining pressure at the lower end of the 3-4 shift valve is supplied from the shift solenoid SS2 is insufficient to overcome the force of the valve spring 400. This makes pressure available from the manual valve to the forward clutch through the orifice control valve and the 2-3 backout valve through orifice 388.

When the manual lever is in the overdrive position and a 4-3 downshift is occurring with part throttle, the overdrive servo regulator valve 314 cushions a 4-3 downshift with part throttle. The overdrive servo regulator valve is a simple regulator valve that modifies the pressure delivered to the apply side of the overdrive servo. The magnitude of the modification depends upon the spring force for the regulator valve spool 438.

When the transmission is in the overdrive range and a 2-1 downshift is occurring with closed throttle, shift solenoid SS2 is off and shift solenoid SS1 is on. Thus, the 1-2 shift valve is forced downward. That keeps the 2-3 shift valve downward also. Since both sides of the overdrive servo are pressurized, the servo is released. The backout valve is shifted in a left-hand direction, and forward clutch pressure is distributed through the backout valve to the forward clutch through orifice 380.

When the manual valve is in the overdrive range position and a 3-2 downshift is occurring with closed throttle, manual valve pressure is distributed through the 3-4 shift valve, which assumes its downward position. Pressure then is distributed through the orifice control valve and to the forward clutch through the orifice 380. The direct clutch is exhausted, as is the lower chamber of the 2-3 accumulator, through passage 316, through the 2-3 shift valve and through exhaust orifice 318.

FIG. 2 summarizes the engagement and the release patterns for effecting ratio changes as the shift solenoids SS1 and SS2 are turned on and off. It should be noted that it is necessary only to change the state of a single solenoid in order to effect a ratio change between adjacent ratios during operation in any of the drive ranges selected by the manual valve. For example, when the manual valve is in the overdrive position, a ratio change from the first ratio to the second ratio is achieved merely by changing the state of shift solenoid SS1 from on to off. The state of solenoid SS2 remains unchanged. Similarly, a ratio change from the second ratio to the third ratio or from the third ratio to the second ratio is effected merely by changing the state of solenoid SS2 while the state of solenoid SS1 remains unchanged. Ratio changes between the third ratio and the fourth ratio are obtained merely by changing the state of solenoid SS1 while the state of solenoid SS2 remains unchanged. This characteristic makes it unnecessary to synchronize the actuation or deactivation of one solenoid with respect to the activation or deactivation of the other solenoid. This simplifies the calibration of the transmission and improves the reliability of the control system.

Shift Solenoid Functional Test

As indicated earlier, the shift solenoid functional test logic is determined by monitoring the 1-2 shift, the 2-3 shift and the 3-4 shift. If any of the tested shifts is a failure, the logic will determine whether that failure is due to a solenoid malfunction. As indicated in FIG. 6A, the first ratio requires shift solenoid 2 (SS2) to be off and shift solenoid 1 (SS1) to be on. For second gear, the shift solenoid 2 (SS2) should be off and shift solenoid 1 (SS1) should be off. For third gear, shift solenoid 2 (SS2) should be on and shift solenoid 1 (SS1) should be off. For fourth gear, shift solenoid 2 (SS2) should be on and shift solenoid 1 (SS1) should be on.

If shift solenoid 1 (SS1) has failed and the failure is in the off state, the chart of FIG. 6A indicates the failed tests and the passed tests. If the requested gear is gear 1, shift solenoid 2 (SS2) should be off and shift solenoid 1 (SS1) should be on. If the actual gear is 2, that may indicate a solenoid malfunction. The bad solenoid is identified by completing the remainder of the strategy steps. Than is, if the requested gear is 2 and the shift solenoid 2 (SS2) is off and the shift solenoid 1 (SS1) is off, a check is made to determine whether the actual gear is second gear. Similarly, if the requested gear is 3 and shift solenoid 2 (SS2) is on and shift solenoid 1 (SS1) is off, a check is made to determine whether the actual gear is also 3. Finally, if the requested gear is 4 and shift solenoid 2 (SS2) is on and shift solenoid 1 (SS1) is off, detection of third gear for the actual gear would indicate that the test for a 3-4 shift is failed. Following a command for a 3-4 shift, no engine speed change is detected since the actual gear is 3 rather than 4. The test for a 1-2 shift also is failed since no change in engine speed is detected consistent with a 1-2 upshift following a command for a 1-2 upshift.

If shift solenoid 1 (SS1) fails on, FIG. 6A shows the solenoid states that detect a failed test for a 1-2 shift, a failed test for a 3-4 shift and a passed test for a 2-3 shift. Thus, in FIG. 6A, if the requested gear is 1 and the actual gear is 1, shift solenoid 2 should be off and shift solenoid 1 should be on. If the requested gear is 2 and the actual gear is one, and if shift solenoid 2 is off and shift solenoid 1 is on, that indicates that the test for a 1-2 shift is failed. If the requested gear is 3 and the actual gear is 4, and if the solenoid 1 fails on, that indicates that the test for a 2-3 shift is passed but the test for a 3-4 shift is failed.

Test Logic

The test logic first includes execution of a shift validation logic. This verifies that a shift has taken place after it is commanded. Only single step upshifts are validated. In order to enter the shift validation logic routine, the temperature range must be within a certain test range. Monitor flags are available to record when a good shift or a bad shift has been validated.

The logic verifies shifts only under steady-state operating conditions. The shifts must be automatic, single-step upshifts with the vehicle off-idle and the vehicle speed above a calibrated minimum speed for each gear. This ensures that the vehicle is under power.

In the execution of the logic, certain entry conditions must be met, including a vehicle speed entry condition. Other entry conditions that must be met are a requirement that the vehicle be in a power-on mode and that the transmission temperature be in a normal range. Furthermore, the gear selector sensor must indicate that the selector lever is in a position that will permit automatic upshifts. If all of the entry conditions are met, the throttle condition, the vehicle speed and the engine speed are recorded at the start of the shift. The engine rpm that can be expected as a result of an upshift is then determined based on the current state of the converter clutch. If the converter clutch is locked up at the start of the shift, a larger engine speed drop can be expected during the shift.

A shift validation logic follows a shift verification logic. The shift can be validated by the validation logic as long as the throttle position and the vehicle speed are steady.

During the shift, the engine speed is monitored until the engine speed peaks. Engine rpm, following the peak, must drop from the peak value by an expected amount within the time allowed by a shift timer, which is calibrated to a time required to complete the shift. If the engine speed drop lasts for a specified amount of time, which is a verification that the drop in engine speed was due to a shift and not due to a transit condition, it can be assumed that the drop in engine rpm signals that a shift has been made. If the engine rpm does not drop sufficiently within the allowed time for which the timer is calibrated, that event is noted by the software and stored in RAM to indicate that there is a shift error and one of the error codes for a bad shift is set. This causes the failure mode action to be executed for a calibratable number of engine warm-up cycles. The failure mode action includes a clipping of the electronic pressure control value to a minimum and a vehicle dash indicator light or warning light is illuminated.

Shift Verification Logic

Figure 7A:
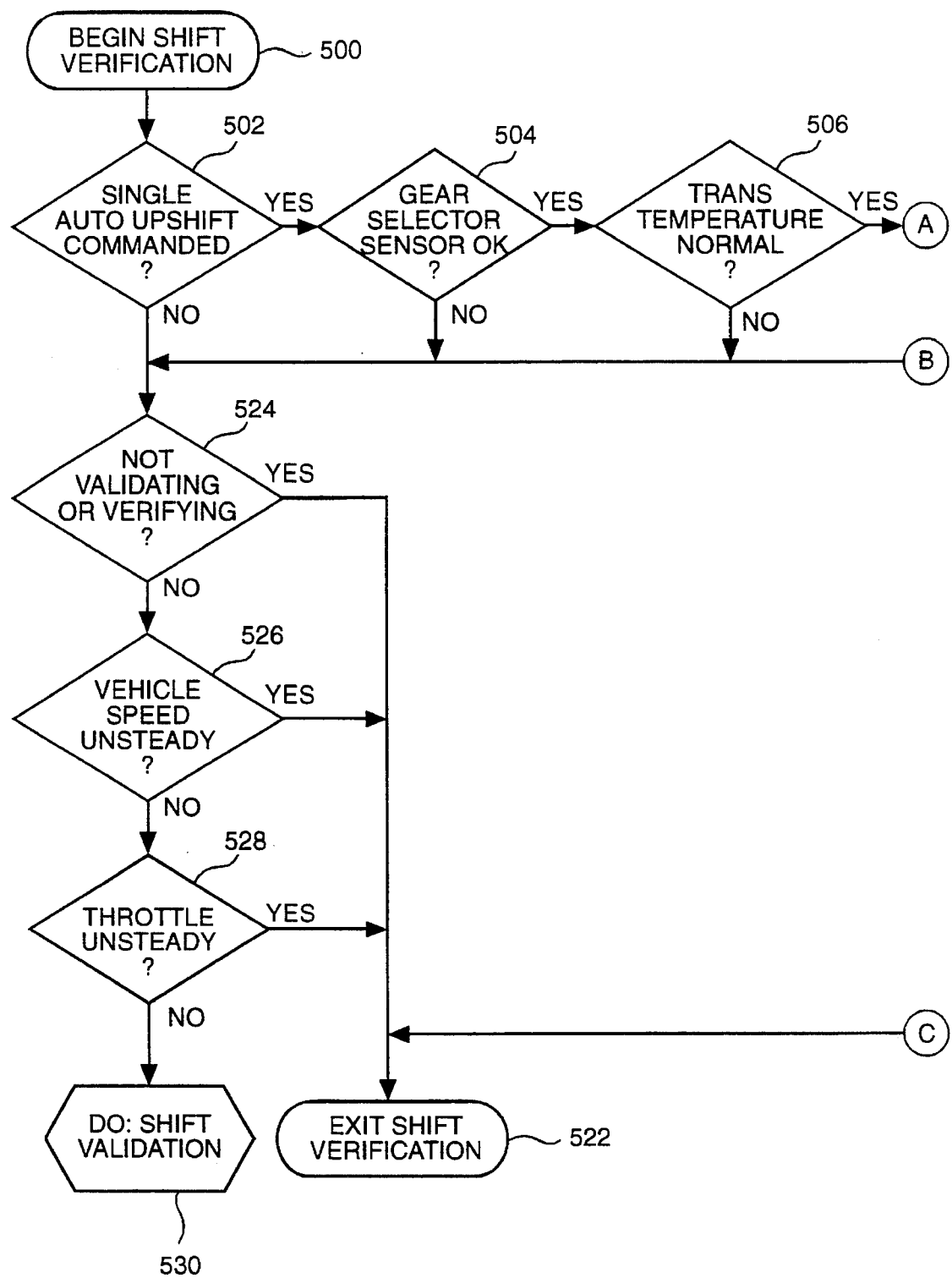
FIGS. 7A and 7B show a flow diagram indicating the shift verification logic performed by the microprocessor.
Figure 7B:
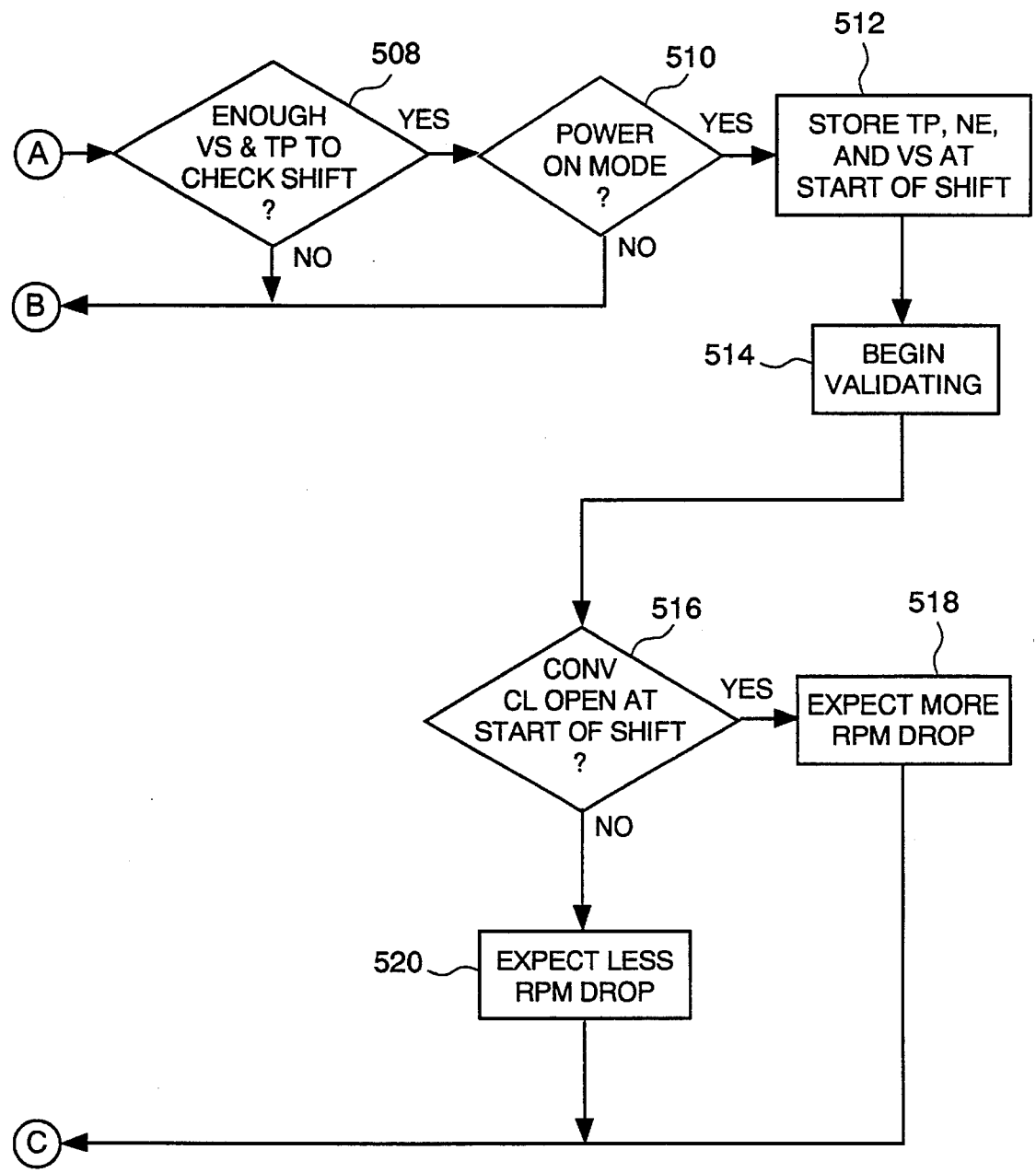

FIGS. 7A and 7B show a function flow diagram that illustrates the software algorithm for the diagnostics described briefly in the foregoing paragraphs. At the beginning of each background pass for the microprocessor, the shift verification logic is executed. This begins at step 500. The routine proceeds to step 502. If a single step upshift has been commanded, the CPU will address a register in RAM in which is stored an upshift indicator that confirms a single automatic upshift has been commanded. If that is the case, a check is made at step 504 as to whether the manual driver range selector lever has been set by the vehicle operator to a position that will make it possible to achieve automatic upshifts. If the appropriate range selector position sensor signal is developed, the routine will check next at step 506 whether the transmission temperature is in a normal temperature range. This is achieved by referring to the output signal of the temperature sensor.

The routine then moves to step 508 in FIG. 7B where the output signal of the vehicle speed sensor is checked at the register in memory where the vehicle speed signal is stored to determine whether the threshold vehicle speed has been reached. At step 508, the throttle position signal developed by the throttle position sensor is checked to determine whether a minimum throttle position is in place. If the result of the test at step 508 is affirmative, it is determined at step 510 whether the vehicle is in a power-on mode, as distinct from a coasting mode or an idling mode. If the result of the test at step 510 is affirmative, the throttle position, the engine speed and the vehicle speed signals are stored in memory as indicated by the action block 512. This is done at the start of the shift that has been commanded at step 502. After storing this data, the routine moves to action block 514 where the microprocessor begins the validation strategy routine. This involves the setting of the flag that will call for the entering of the shift validation routine to be described with reference to FIGS. 8A and 8B.

The microprocessor will detect whether the converter is open or locked up by the convertor clutch. This test is made at step 516. If the converter is open, a larger engine speed drop will be expected at action block 518 than if the converter clutch is applied. If the converter clutch is applied, the routine will enter action block 520 at which the lower value for the expected engine rpm drop is stored.

The microprocessor continuously monitors changes in engine speed. If it does not see a value for rpm drop indicated at 518 in the case of an open convertor or the expected rpm drop stored at 520 in the case of a locked up convertor, the shift verification will end, as indicated by the exit step 522. During the next background pass, the routine will return to stage 500 and the test that is conducted at step 502 will be negative so that the routine will proceed directly to step 524. Inquiries made at that step to determine whether the strategy is in the validating mode or the verifying mode. Since the expected rpm drop has not been reached, the result of the inquiry after step 524 is negative, whereupon the routine proceeds to step 526 where it is determined whether the vehicle speed is steady or unsteady. If the vehicle speed is unsteady, the routine will then exit at step 522 as previously described. If the vehicle speed is steady, the routine will then check the throttle at step 528 to determine whether the throttle setting is steady or unsteady. If the throttle setting is unsteady, again the routine will exit at step 522. If the throttle position is held steady, the routine then will enter the shift validation mode 530.

Shift Validation Logic

FIGS. 8A and 8B show the software routine for shift validation which begins at stage 532. A test is made at step 534 to determine whether the time allowed to complete the shift has expired. If the engine speed sensor does not detect an engine speed drop equal to the values that are stored at action block 518 or 520 and the shift completion time has expired, that is an indication that the shift has not been completed and that there is a missed shift. The routine then will proceed to action block 536 where the validating routine or the verifying routine is interrupted. At that point, the gear command logic is carried out as indicated at stage 538 and the shift validation logic routine exits as shown at 540.

If the shift completion time has not expired, that would indicate that the shift has not been completed and the routine will proceed to step 542. A test is made at that point by comparing the instantaneous engine speed following the shift command with the engine speed measured in the previous background loop to determine whether a new peak engine speed has been achieved. If there is a new peak engine speed detected, a check is made of the flag that was set in action block 514 to determine whether the routine is still validating. This is done at step 544. If the flag is still set, the new peak engine speed is stored, as indicated at action block 546.

If there is no new peak engine speed detected at step 542, or if the check made at step 544 is negative, the routine will proceed to check again at step 548 to determine whether the logic is continuing in the validation mode. If the answer is affirmative, a check again is made at step 550 to determine whether the expected engine speed drop has been reached by comparing the expected value stored at action block 518 in the verification logic with the actual engine speed that is sensed by the engine speed sensor. If the expected engine speed drop has indeed been experienced, the shift will have been validated and validation logic routine is stopped at action block 552. The logic then returns to the shift verification logic module. If the verification logic has begun after testing for this at step 554, it is determined whether there still is the expected engine speed drop detected at action block 518 or 520 in FIG. 7B. This is done at step 556. If the result of the test at step 556 is affirmative, a test then is made at step 558 as to whether the timer for measuring the shift interval has run down. If the engine speed drop has continued long enough, the shift is considered to have been validated, as indicated at 560, and the shift verification logic stops.

The routine then proceeds to stage 562 where the gear command logic is begun. The validation logic flow then moves to the exit for shift validation at 540.

If the inquiry at step 556 or the inquiry at step 558 is negative, the routine will continue in the shift verification logic mode. If that is confirmed at step 564, the logic will proceed to step 566 where it is checked once again whether the expected engine speed drop still is in place. If the expected engine speed drop still is in place, the validation logic is finished and the routine exits at 540. If the expected engine speed drop is not maintained for the full time set by the shift timer, verification is stopped, as indicated at action block 568, and a flag is set to cause the routine to reenter the shift validation mode during the next background loop. The validation steps for the current loop then exits at 540.

Gear Command Logic

Figure 9:
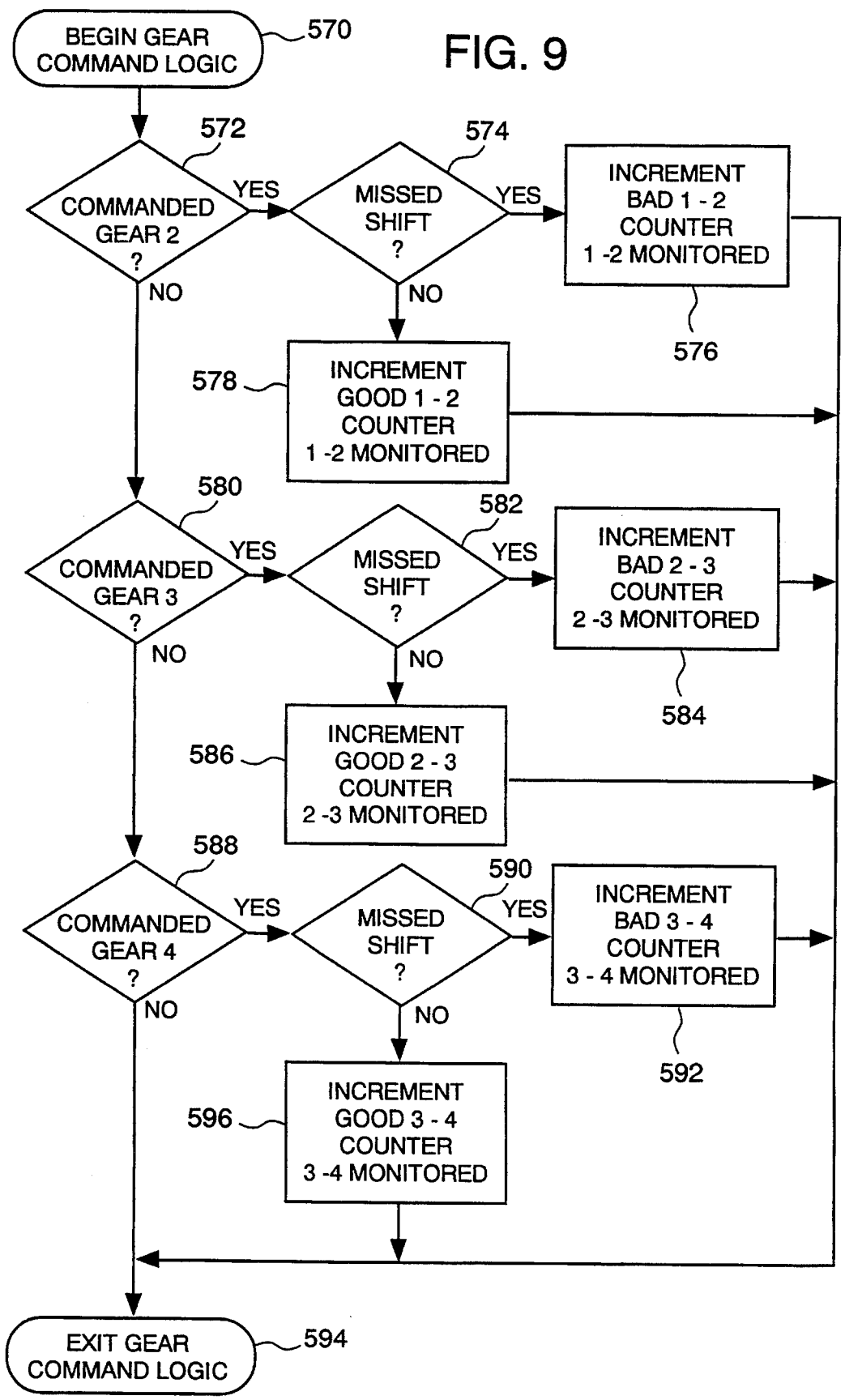
FIG. 9 is a flow chart showing the gear command logic for the microprocessor.

The entering of the gear command routine described with reference to stage 562 in FIG. 8B is indicated in FIG. 9. The gear command logic begins at stage 570. A test is made at step 572 as to whether the commanded gear is gear 2. If in fact the actual gear differs from the commanded gear, that would indicate a missed shift. That test occurs at step 574. If there is a missed shift, a counter that records missed shifts will be incremented at action block 576. The processor will continue during each background loop to make a test for a missed 1-2 shift in this fashion. The processor includes a counter for counting the missed shifts as the missed shifts are continuously monitored. After several increments determined by the calibration, an error code is set.

If there is not a missed shift, a good shift is counted at action block 578. The number of good shifts is counted by the counter in the processor and stored in RAM.

If the second gear is not the commanded gear, the routine then will proceed directly to step 580 where a test is made as to whether the commanded gear is gear 3. If the commanded gear is 3 and a missed shift is detected at step 582, the routine will proceed to action block 584 where a bad 2-3 shift is incremented and counted. After several increments, an error code for a bad 2-3 shift is set. If the actual gear is gear 3, as tested at step 582, that would indicate that there is no missed shift. That means that the 2-3 shift is good. The good 2-3 shift is counted and recorded in RAM at action block 586.

If the commanded gear is not 3 but rather 4, as tested at step 588, a similar routine is followed. If the commanded gear is gear 4 rather than gear 2 or gear 3, a similar routine is carried out by making a test at step 590 as to whether the 3-4 shift has been missed. If the commanded gear is 4 but the actual gear is something other than 4 (for example, 3), that would indicate a missed shift. If the 3-4 shift has been missed, as detected at step 590, the counter that counts the bad 3-4 shifts will be incremented at action block 592. After several increments are made and recorded in RAM as the 3-4 bad shift counter is monitored, an error code will be set as in the case of the actions taken at blocks 576 and 584. If the commanded gear is not 4, the gear command logic is terminated as shown at 594.

If there is no missed shift, that would indicate that the 3-4 shift is good. A good 3-4 shift is counted, and the shift is recorded in memory.

Each of the shifts indicated in the diagram of FIG. 8 requires a separate timer. Thus, the time required to complete the 1-2 shift and to determine whether a missed 1-2 shift has occurred is different than the timer setting for detecting whether there has been a missed 2-3 shift at step 582. Similarly, the timer setting for detecting a missed 3-4 shift is unique to that shift.

Shift Solenoid Functional Test

Figure 10A:
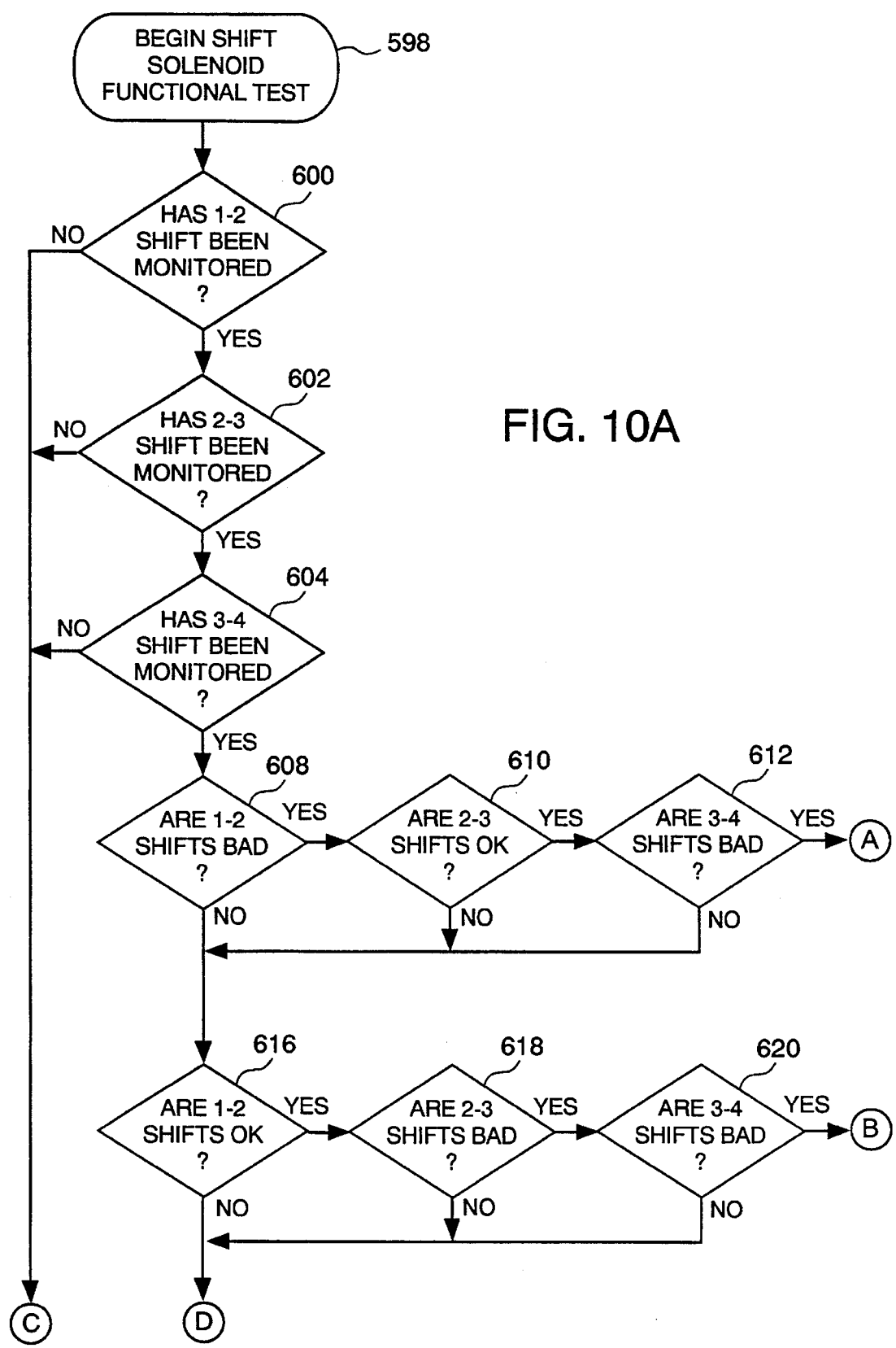
FIGS. 10A, 10B and 10C show a flow diagram for the shift solenoid functional test logic for indicating bad shifts.
Figure 10B:
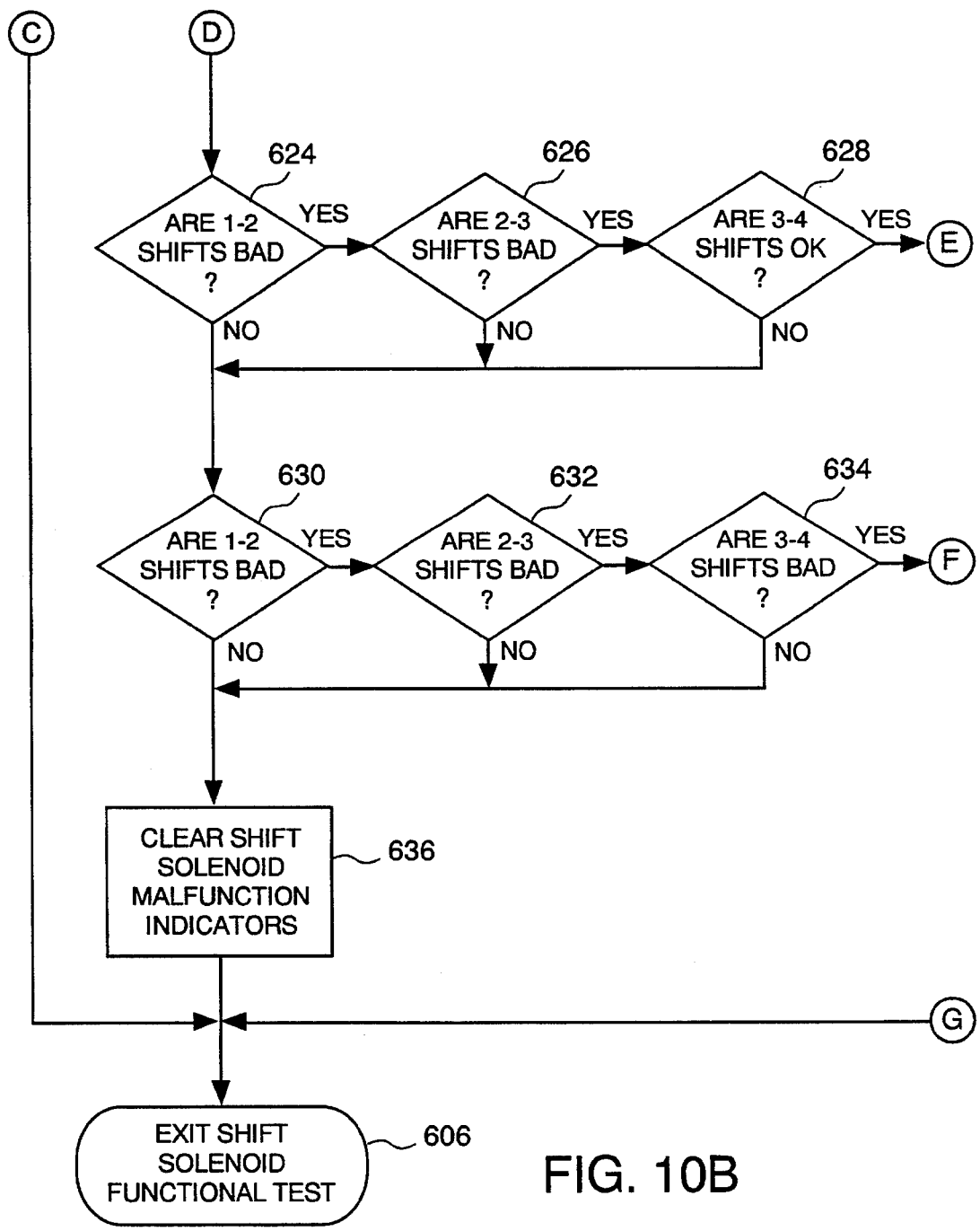
Figure 10C:
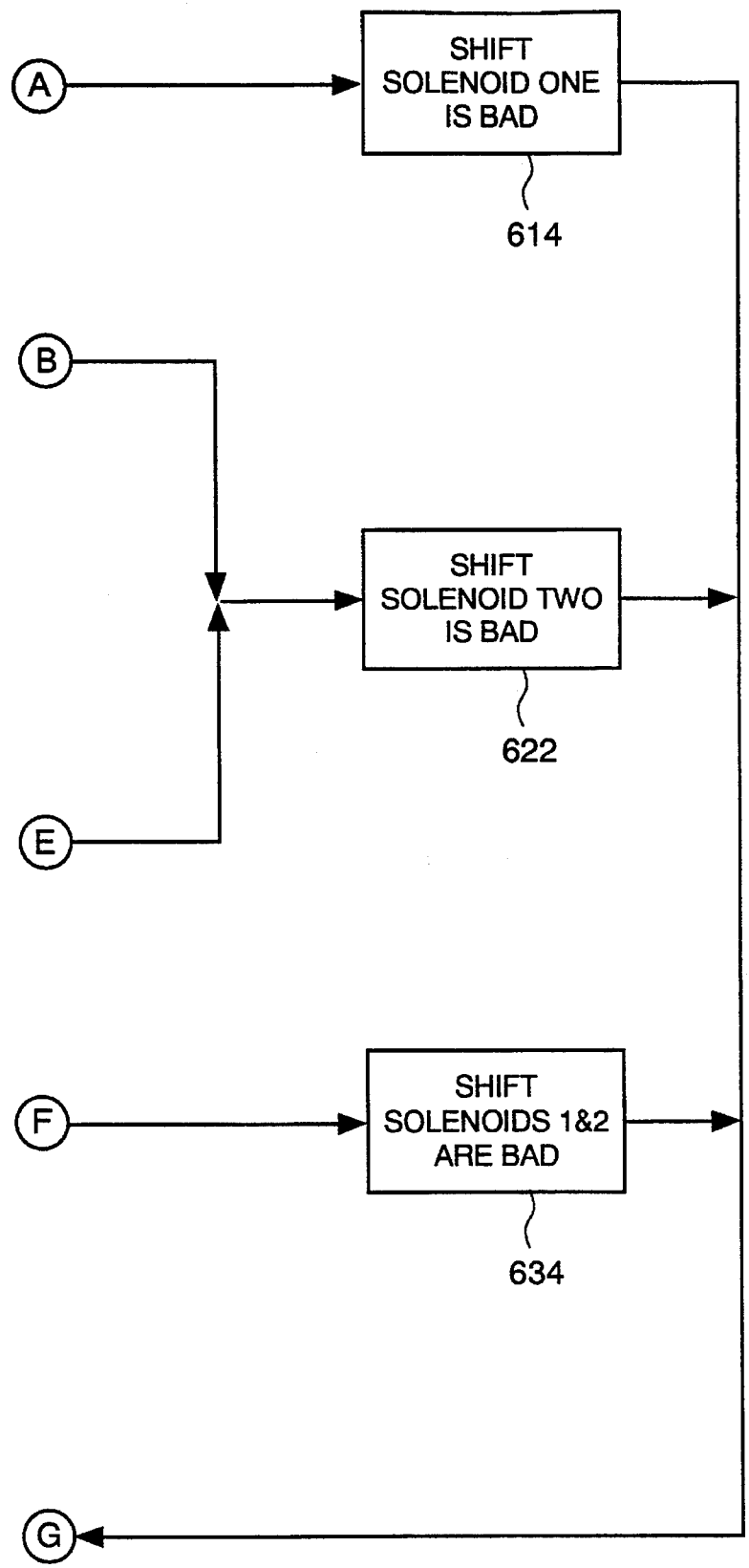

After the gear command logic has been completed, the shift solenoid functional test logic begins as indicated in FIG. 10A at 598. This involves a testing of whether the 1-2 shift has been monitored, as indicated at 600, whether the 2-3 shift has been monitored, as indicated at step 602, and whether the 3-4 shift has been monitored, as indicated at step 604. If the inquires at any of the steps 600, 602 or 604 is negative, the routine will exit as shown at 606. If all of the shifts have been monitored as indicated in FIG. 8 at 576, 584 and 592, the routine will proceed to step 608, as indicated in FIG. 9.

If the result of the gear command logic indicates that there are bad 1-2 shifts, the inquiry at step 608 will be positive. The routine then will test whether the error code for missed 2-3 shifts has been set at action block 584. This test is made at step 610 in FIG. 9. If the 203 shifts are good, a test then is made at step 612 to determine whether the 3-4 shifts are bad, as determined at action block 592.

If the 1-2 shifts are bad and the 2-3 shifts are good and the 3-4 shifts are bad, that would indicate that solenoid 1 is bad, as determined at action block 614. This information is used to call out an error code that is accessible to the vehicle service person so that the source of the malfunction can be isolated and a repair routine can be carried out.

If the 1-2 shifts are not bad, and if the 2-3 shifts are not good (i.e., the 2-3 shifts are bad), and the 3-4 shifts are not bad (i.e., the 3-4 shifts are good), then the routine will proceed to step 616 where an inquiry is made as to whether the 1-2 shifts are good. If they are good, a test is made at step 618 as to whether the 2-3 shifts are bad. That is followed by a test at 620 to determine whether the 3-4 shifts are bad. These tests are made merely by referring to the results of the actions taken at action blocks 576, 584 and 592 in the routine of FIG. 8. If all of the inquires at step 616, 618 and 620 are positive, that indicates that the shift solenoid 2 is bad. Thus, at action block 622 the error code for a bad shift solenoid 2 is called out. That error code can be identified, as in the case of action block 614, by the service person.

If the inquires at step 616, 618, 620 are negative, the routine will proceed then to step 624 where a check is made as to whether the 1-2 shifts are bad as a result of the monitoring that takes place at action block 576. If the 1-2 shifts are bad, it is then detected at step 626 whether the 2-3 shifts are bad. That is done by referring to the results of the monitoring at action block 584. If the 2-3 shifts are bad, the routine will check at step 628 as to whether the 3-4 shifts are good. That is done by referring to the results of the monitoring at action block 592. If the tests at steps 624, 626 and 628 are affirmative, that indicates, as shown at action block 622, that shift solenoid 2 is bad. Thus, shift solenoid 2 can be indicated to be bad by any one of two routes or routines.

If the 1-2 shifts are bad, as determined at 608, 616 and 624, the routine will proceed directly from step 604 to step 630 where it is confirmed that the 1-2 shifts are bad. In that case, a test is made at step 632 to determine whether the 2-3 shifts are bad, that is done by referring to the results of the monitoring at action block 584. If the 2-3 shifts indeed are bad, a test is made at step 634 to determine whether the 3-4 shifts are bad. That is done, as mentioned earlier, by looking at the results of the monitoring that occurs at action block 594. If all of the tests at 632 and 634 are positive, the routine will proceed to action block 634 where it is confirmed that shift solenoid 1 and 2 are both bad. Again, an error code is stored at action block 634, indicating a bad solenoid 1 and a bad solenoid 2. The service person can access that code.

If the results of the tests at steps 630, 632 and 634 all are negative, all shift solenoid malfunction indicators are cleared at 636. That is, shift solenoid malfunction flags are cleared and the routine can exit the shift solenoid functional test at 606.

Having described a preferred embodiment of the invention, what we claim and desire to secure by United States Letters Patent is:

What is claimed is:

1. An electronic control system for an automatic, multiple-ratio transmission for an engine powered vehicle, wherein said transmission has fluid pressure operated brake and clutch means for establishing and disestablishing in sequence four forward-driving ratios;

said control system having an engine-driven fluid pump, a shift valve circuit including first and second solenoid shift valve means for controlling pressure distribution to and from said brake and clutch means, each shift valve means having on and off states and being adapted to establish a ratio change upon a single change in state; and diagnostic test means for monitoring ratio changes by identifying the on and off states of each solenoid shift valve means following initiation of a ratio shift as said solenoid shift valve means change states in a predetermined pattern during said ratio changing sequence;

said diagnostic test means including means for comparing state changes of said solenoid shift valve means during a shift with a predetermined state change pattern wherein non-functioning solenoid shift valve means can be identified.

2. The control system as set forth in claim 1 wherein said diagnostic test means includes means for monitoring actuation of both of said shift solenoid valve means and recording successive malfunctions of each shift solenoid valve means, and means for triggering a malfunction indicator and error code when cumulative malfunctions exceed a predetermined number.

3. The control system as set forth in claim 1 wherein said diagnostic test means includes means for detecting engine speed changes during ratio changes and timer means for timing said engine speed changes wherein a reduced engine speed for a predetermined time following an initiation of a ratio change identifies a completed ratio shift.

4. The control system as set forth in claim 2 wherein said diagnostic test means includes means for detecting engine speed changes during ratio changes and timer means for timing said engine speed changes wherein a reduced engine speed for a predetermined time following initiation of a ratio change identifies a completed ratio shift.

5. A diagnostic test method for identifying malfunctioning shift valve solenoids in an automatic transmission control system with multiple ratios, said control system including multiple shift valve elements adapted to establish and to disestablish at least four transmission ratios, said transmission being adapted to deliver torque from a throttle controlled engine in a driveline for a vehicle;

said method comprising the steps of continuously monitoring engine speed during a transmission ratio change to detect a speed change consistent with a changed ratio, timing said changed engine speed to detect whether the duration of said changed speed exceeds a predetermined limit thus indicating a completed shift;

sensing engine throttle position during a ratio shift to determine whether the throttle position exceeds a predetermined limit;

sensing vehicle speed during a ratio shift to determine whether the vehicle speed exceeds a predetermined limit;

detecting completed shifts throughout a vehicle operating interval involving said four transmission ratios;

recording completed shifts during said operating interval with engine throttle position and vehicle speed above their respective predetermined limits; and comparing said recorded completed shifts during said operating interval with a predetermined pattern of shifts wherein discrepancies between the actual completed shift pattern and said predetermined shift pattern can be identified, thus identifying a malfunction in a particular shift valve solenoid.

6. The diagnostic test method of claim 5 wherein said steps include separate test routines comprising a shift verification routine, a shift validation routine and a gear command routine;

said routines being executed in sequence;

said shift verification routine comprising the steps of determining whether a single ratio upshift has been commanded, determining whether the transmission control system is adapted for automatic upshifts, determining whether vehicle speed and throttle position are above their respective predetermined limits, recording throttle position engine speed and vehicle speed at the start of a shift;

said shift validation routine including the steps of detecting and recording a change in engine speed following a command for a ratio change; and measuring the duration of said change in engine speed and comparing that duration with a predetermined shift time duration.

7. The method as set forth in claim 6 wherein said gear command routine comprises the steps of determining for each gear ratio during a vehicle operating interval whether a ratio change has been missed following a command for that ratio change, and monitoring said missed shifts for each ratio during said vehicle operating interval, a shift being characterized by corresponding engine speed reduction.

8. The method as set forth in claim 6 wherein said shift verification routine includes the steps of monitoring vehicle speed to determine whether vehicle speed is steady and monitoring throttle position to determine whether throttle position is steady and interrupting said test method if vehicle speed and throttle position are not steady.

9. The method as set forth in claim 7 wherein said shift verification routine includes the steps of monitoring vehicle speed to determine whether vehicle speed is steady and monitoring throttle position to determine whether throttle position is steady and interrupting said test method if vehicle speed and throttle position are not steady.

10. The method as set forth in claim 5 wherein said steps include also a separate solenoid functional test routine comprising the steps of identifying an error code that identifies the shift valve solenoids corresponding to an identified malfunction, recording a pattern of said discrepancies, comparing said pattern with known error codes until a match is formed between said pattern and an error code, each shift valve solenoid identified as a malfunctioning solenoid having a unique error code whereby malfunctioning shift valve solenoids may be serviced.

* * * * *